US012712378B2

(12) United States Patent
Itoi et al.

(10) Patent No.: US 12,712,378 B2
(45) Date of Patent: Aug. 18, 2026

(54) IMAGE CAPTURING APPARATUS, METHOD FOR CONTROLLING SAME, AND STORAGE MEDIUM

(71) Applicant: CANON KABUSHIKI KAISHA, Tokyo (JP)

(72) Inventors: Yudai Itoi, Tokyo (JP); Yuki Tsujimoto, Tokyo (JP); Takuma Iwagami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 18/902,622

(22) Filed: Sep. 30, 2024

(65) Prior Publication Data

US 2025/0112490 A1 Apr. 3, 2025

(30) Foreign Application Priority Data

Oct. 2, 2023 (JP) ................................. 2023-171526

(51) Int. Cl.
*H04N 25/709* (2023.01)
*H02J 7/00* (2026.01)
(Continued)

(52) U.S. Cl.
CPC .............. *H02J 7/977* (2026.01); *H02J 7/865* (2026.01); *H02J 7/975* (2026.01); *H04N 1/00885* (2013.01); *H04N 1/00904* (2013.01); *H04N 23/65* (2023.01); *H04N 23/651* (2023.01); *H04N 23/667* (2023.01); *H04N 25/709* (2023.01); *H02J 7/80* (2026.01); *Y02E 60/10* (2013.01)

(58) Field of Classification Search
CPC ........... H04N 1/00885; H04N 1/00904; H04N 23/65; H04N 23/651; H04N 23/667; H04N 25/709; H02J 7/80; H02J 7/865; H02J 7/975; H02J 7/977; Y02E 60/10
See application file for complete search history.

(56) References Cited

U.S. PATENT DOCUMENTS

| | | | | |
|---|---|---|---|---|
| 12,382,165 B2 * | 8/2025 | Itoi | ........................ | H04N 23/65 |
| 2002/0017822 A1 * | 2/2002 | Umemura | .............. | H02J 7/345 307/66 |
| 2006/0233564 A1 * | 10/2006 | Yamamoto | ......... | H04N 1/32683 399/88 |

FOREIGN PATENT DOCUMENTS

| | | |
|---|---|---|
| JP | 2008061492 A | 3/2008 |
| JP | 2009261147 A | 11/2009 |
| JP | 2013081329 A | 5/2013 |

* cited by examiner

*Primary Examiner* — Lin Ye
*Assistant Examiner* — Chriss S Yoder, III
(74) *Attorney, Agent, or Firm* — Canon U.S.A., Inc. IP Division

(57) ABSTRACT

An apparatus includes a load circuit, a power source, a power storage device, a charging circuit, and a temperature detection unit, a control unit that controls power supply to the load circuit according to a state of the apparatus. The control unit, in a first state, performs control so that power is supplied from the power source to the load circuit without power being supplied from the power storage device to the load circuit and, in a second state, performs control so that power is supplied from the power source and the power storage device to the load circuit, and the control unit sets a charging complete voltage of the power storage device via the charging circuit depending on a temperature detected by the temperature detection unit.

16 Claims, 16 Drawing Sheets

(51) Int. Cl.

| | |
|---|---|
| ***H02J 7/80*** | (2026.01) |
| ***H02J 7/90*** | (2026.01) |
| ***H04N 1/00*** | (2006.01) |
| ***H04N 23/65*** | (2023.01) |
| ***H04N 23/667*** | (2023.01) |

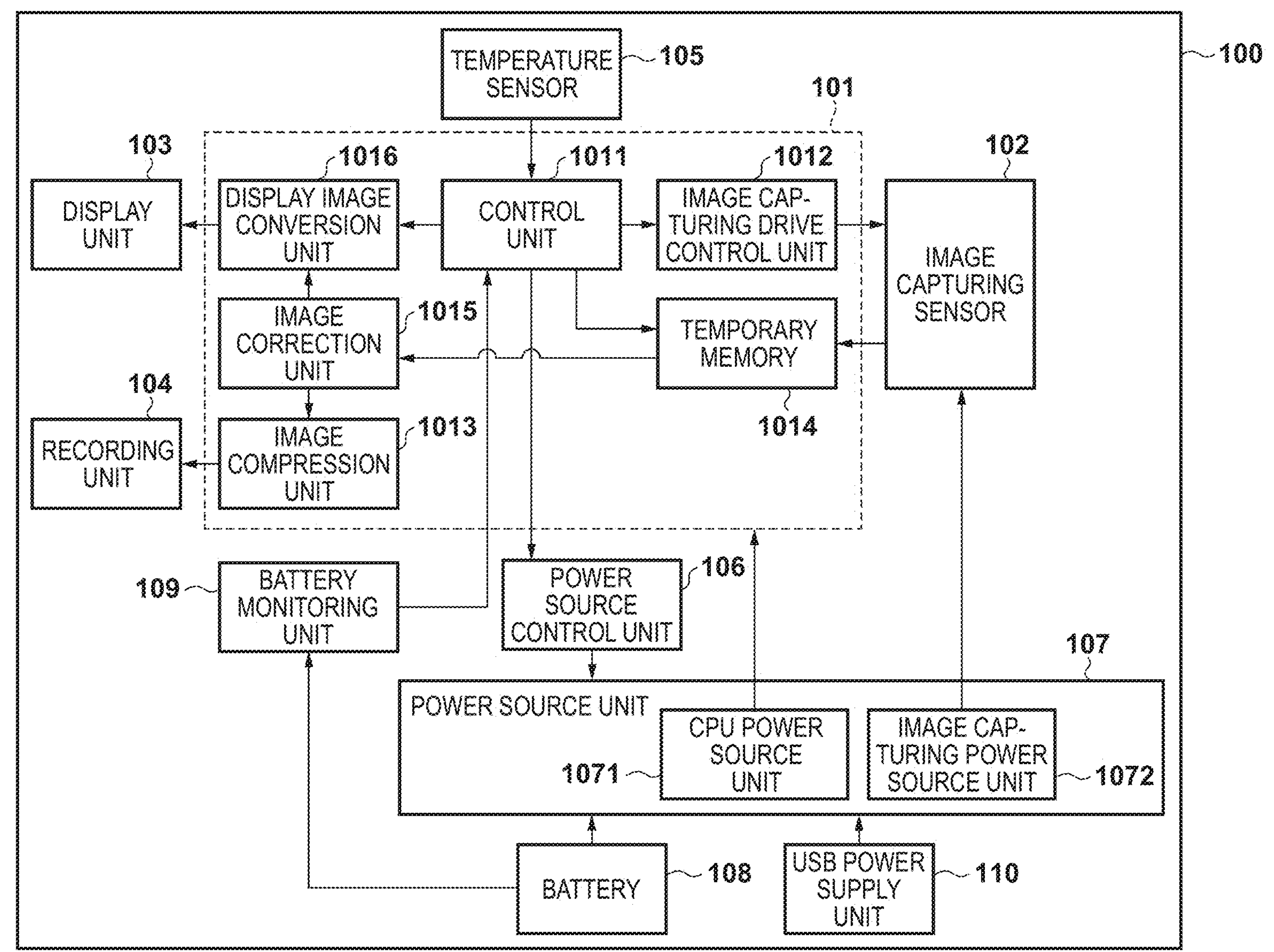
FIG. 1
100
TEMPERATURE SENSOR
105
101
103
DISPLAY UNIT
1016
DISPLAY IMAGE CONVERSION UNIT
1011
CONTROL UNIT
1012
IMAGE CAP-TURING DRIVE CONTROL UNIT
102
IMAGE CAPTURING SENSOR
IMAGE CORRECTION UNIT
1015
TEMPORARY MEMORY
1014
104
RECORDING UNIT
IMAGE COMPRESSION UNIT
1013
109
BATTERY MONITORING UNIT
POWER SOURCE CONTROL UNIT
106
107
POWER SOURCE UNIT
CPU POWER SOURCE UNIT
1071
IMAGE CAP-TURING POWER SOURCE UNIT
1072
BATTERY
108
USB POWER SUPPLY UNIT
110

TEMPERATURE SENSOR
105
101
1011
CONTROL UNIT
102
IMAGE CAPTURING SENSOR
POWER SOURCE CONTROL UNIT
106
107
103
BATTERY
110
USB POWER SUPPLY UNIT
201
IMAGE CAPTURING MAIN POWER SOURCE UNIT
203
SUPPLY SOURCE SELECTION UNIT
204
POWER STORAGE DEVICE CHARGING AND DISCHARGING UNIT
202
POWER STORAGE DEVICE UNIT
IMAGE CAPTURING POWER SOURCE UNIT
1072
POWER SOURCE UNIT

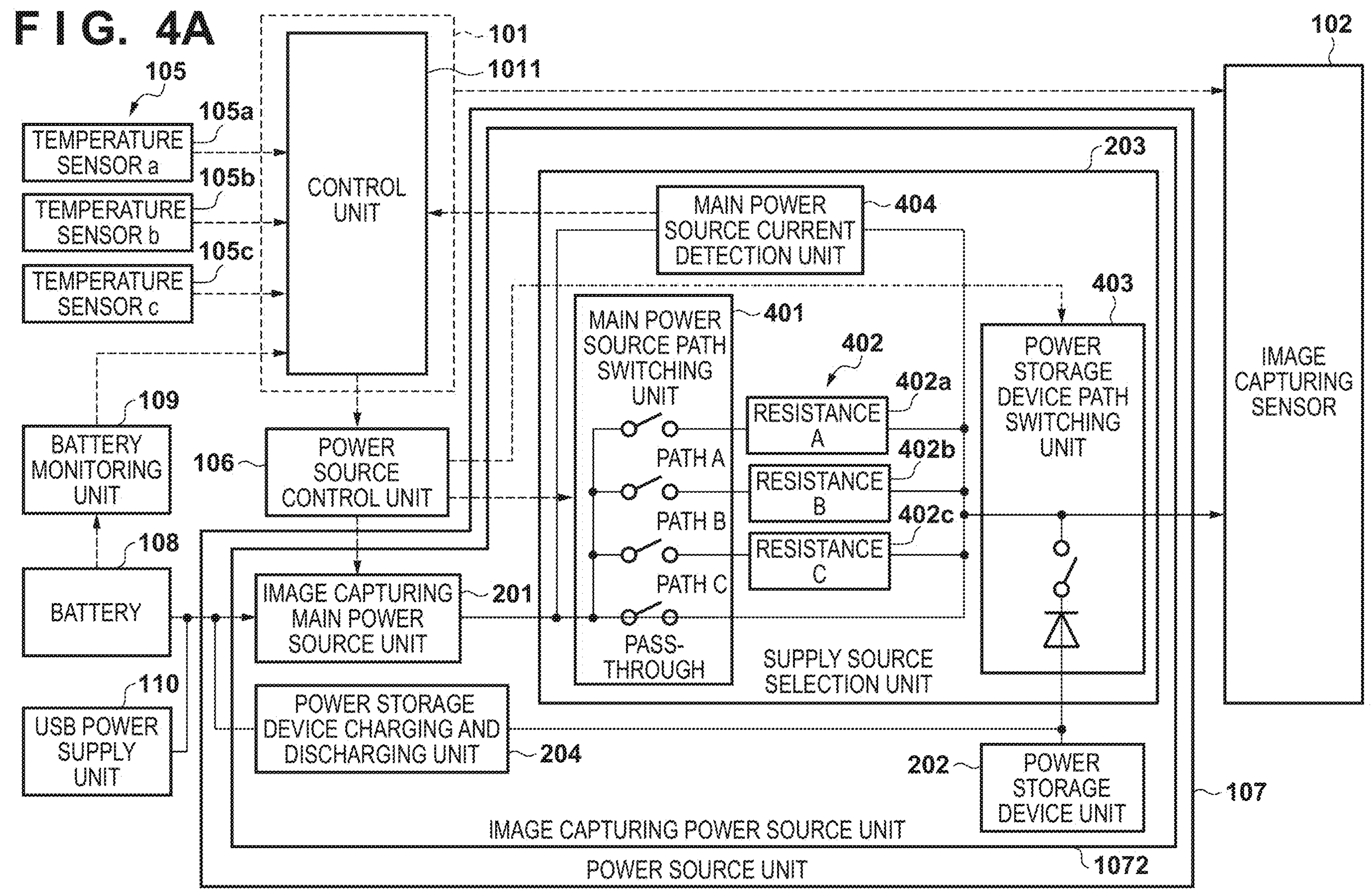
F I G. 4A
101
1011
105
105a
TEMPERATURE SENSOR a
105b
TEMPERATURE SENSOR b
105c
TEMPERATURE SENSOR c
CONTROL UNIT
109
BATTERY MONITORING UNIT
106
POWER SOURCE CONTROL UNIT
108
BATTERY
110
USB POWER SUPPLY UNIT
IMAGE CAPTURING MAIN POWER SOURCE UNIT
201
POWER STORAGE DEVICE CHARGING AND DISCHARGING UNIT
204
203
MAIN POWER SOURCE CURRENT DETECTION UNIT
404
MAIN POWER SOURCE PATH SWITCHING UNIT
401
PATH A
PATH B
PATH C
PASS-THROUGH
402
402a
RESISTANCE A
402b
RESISTANCE B
402c
RESISTANCE C
SUPPLY SOURCE SELECTION UNIT
403
POWER STORAGE DEVICE PATH SWITCHING UNIT
202
POWER STORAGE DEVICE UNIT
107
IMAGE CAPTURING POWER SOURCE UNIT
POWER SOURCE UNIT
1072
102
IMAGE CAPTURING SENSOR

FIG. 4B

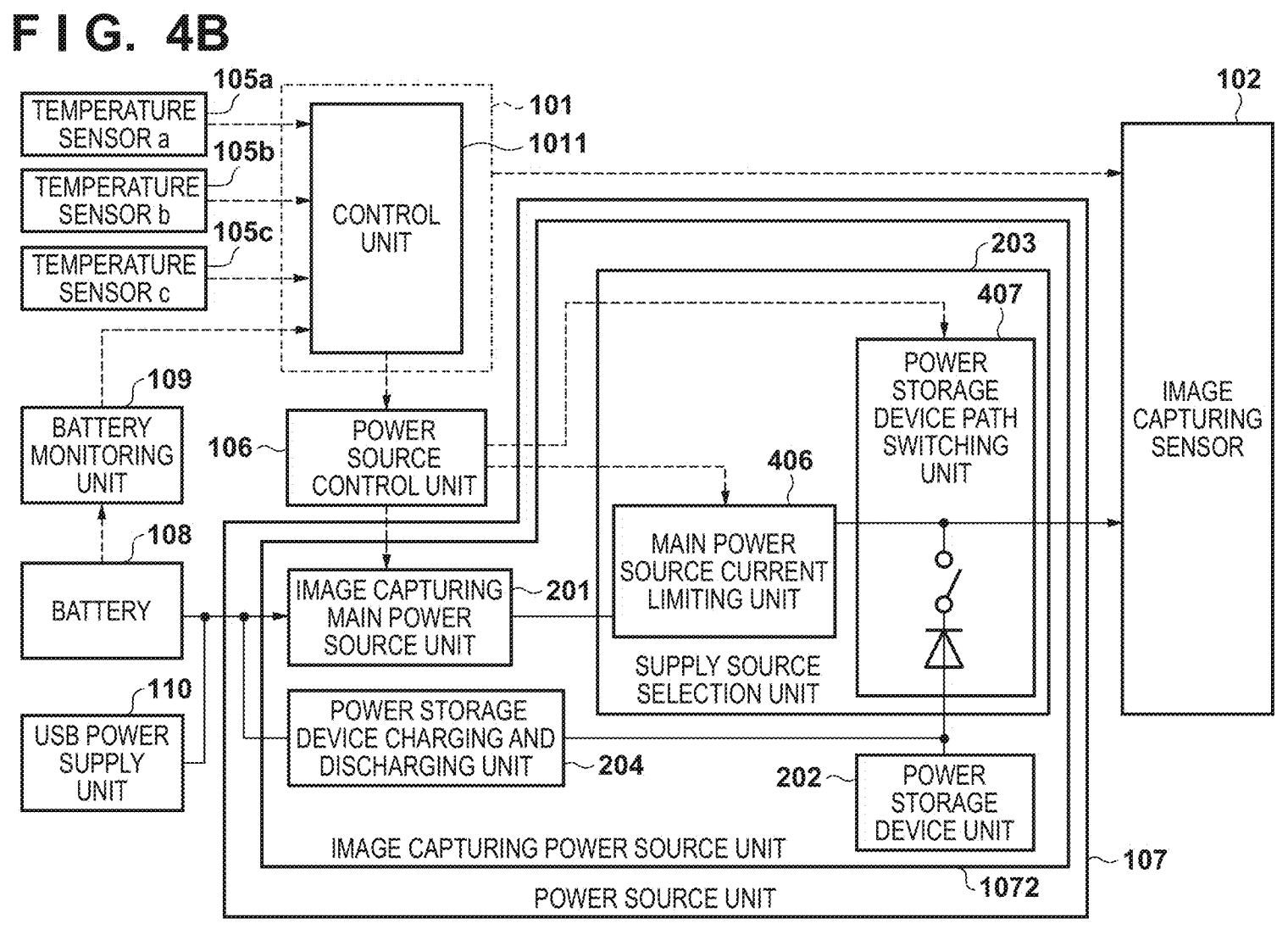

102 IMAGE CAPTURING SENSOR

107 POWER SOURCE UNIT

1072 IMAGE CAPTURING POWER SOURCE UNIT

203 SUPPLY SOURCE SELECTION UNIT

407 POWER STORAGE DEVICE PATH SWITCHING UNIT

406 MAIN POWER SOURCE CURRENT LIMITING UNIT

202 POWER STORAGE DEVICE UNIT

201 IMAGE CAPTURING MAIN POWER SOURCE UNIT

204 POWER STORAGE DEVICE CHARGING AND DISCHARGING UNIT 101 1011 CONTROL UNIT

106 POWER SOURCE CONTROL UNIT

105a TEMPERATURE SENSOR a

105b TEMPERATURE SENSOR b

105c TEMPERATURE SENSOR c

109 BATTERY MONITORING UNIT

108 BATTERY

110 USB POWER SUPPLY UNIT

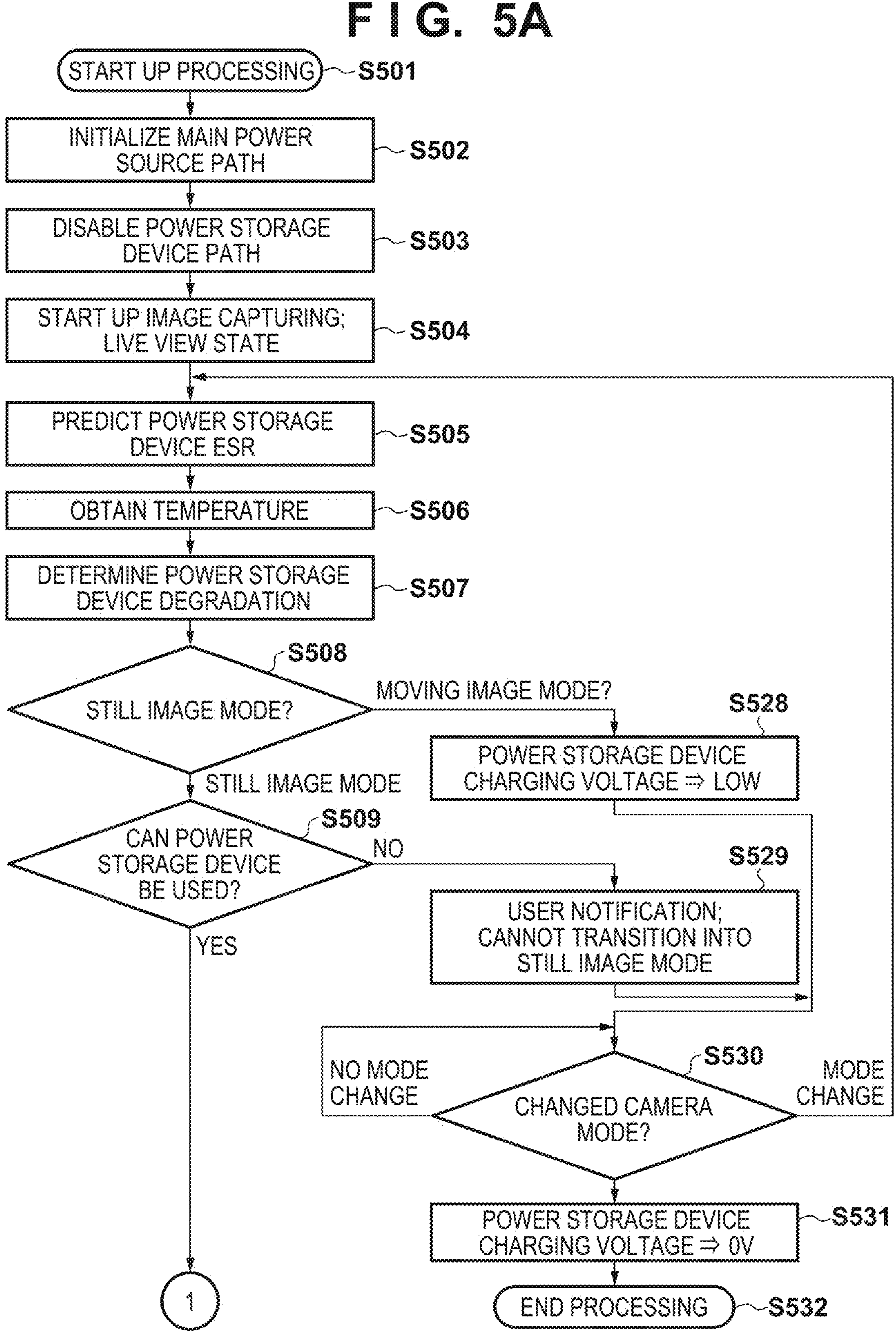
F I G. 5A
START UP PROCESSING
S501
INITIALIZE MAIN POWER SOURCE PATH
S502
DISABLE POWER STORAGE DEVICE PATH
S503
START UP IMAGE CAPTURING; LIVE VIEW STATE
S504
PREDICT POWER STORAGE DEVICE ESR
S505
OBTAIN TEMPERATURE
S506
DETERMINE POWER STORAGE DEVICE DEGRADATION
S507
STILL IMAGE MODE?
S508
MOVING IMAGE MODE?
STILL IMAGE MODE
POWER STORAGE DEVICE CHARGING VOLTAGE ⇒ LOW
S528
CAN POWER STORAGE DEVICE BE USED?
S509
NO
YES
USER NOTIFICATION; CANNOT TRANSITION INTO STILL IMAGE MODE
S529
NO MODE CHANGE
CHANGED CAMERA MODE?
S530
MODE CHANGE
POWER STORAGE DEVICE CHARGING VOLTAGE ⇒ 0V
S531
END PROCESSING
S532
1

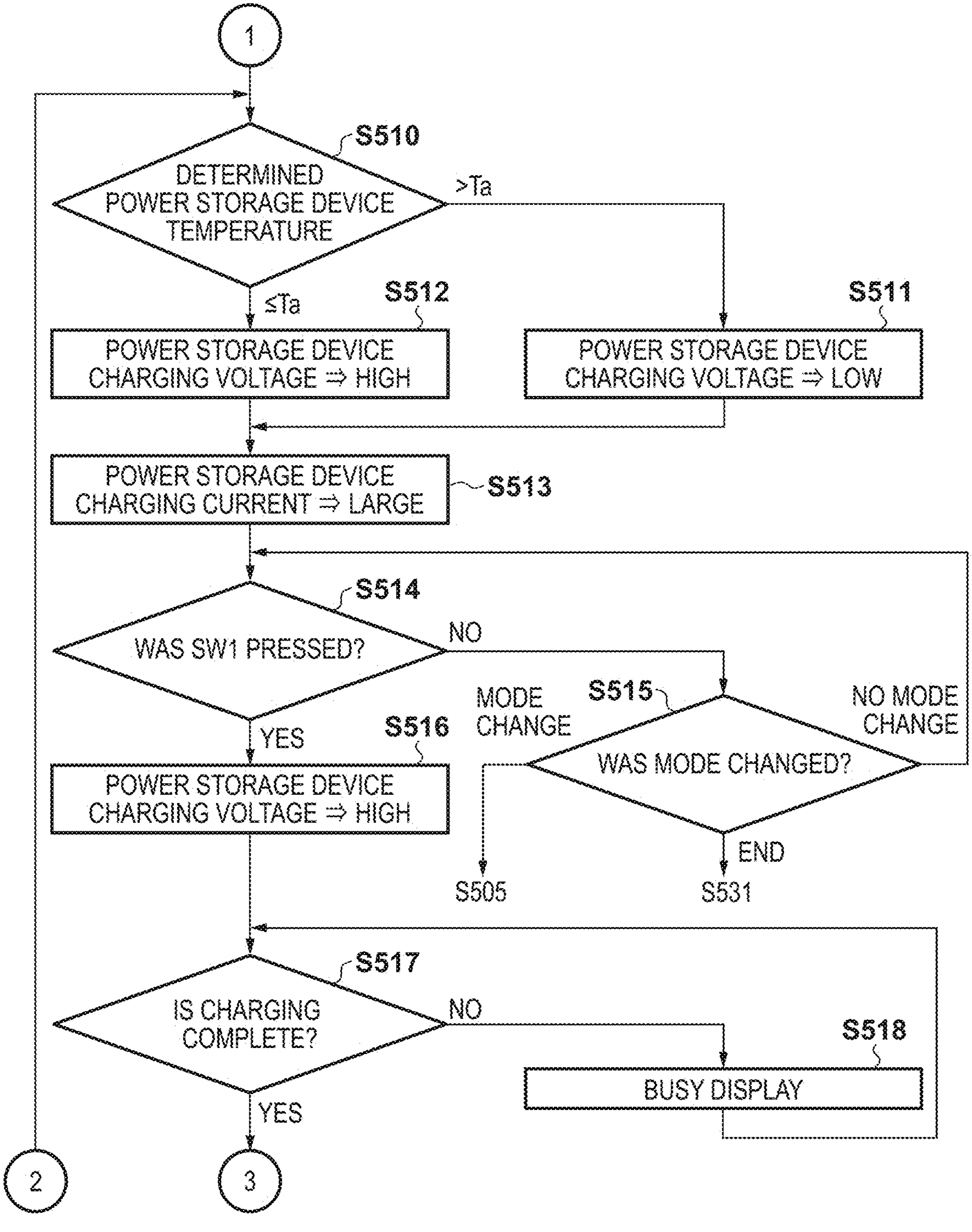
F I G. 5B
1
S510
DETERMINED POWER STORAGE DEVICE TEMPERATURE
>Ta
≤Ta
S512
POWER STORAGE DEVICE CHARGING VOLTAGE ⇒ HIGH
S511
POWER STORAGE DEVICE CHARGING VOLTAGE ⇒ LOW
POWER STORAGE DEVICE CHARGING CURRENT ⇒ LARGE
S513
S514
WAS SW1 PRESSED?
NO
YES
S516
POWER STORAGE DEVICE CHARGING VOLTAGE ⇒ HIGH
MODE CHANGE
S515
WAS MODE CHANGED?
NO MODE CHANGE
END
S505
S531
S517
IS CHARGING COMPLETE?
NO
S518
BUSY DISPLAY
YES
2
3

F I G. 6A
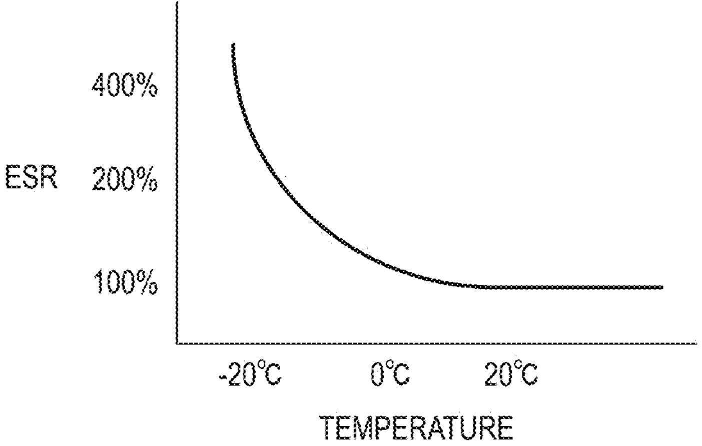
F I G. 6B
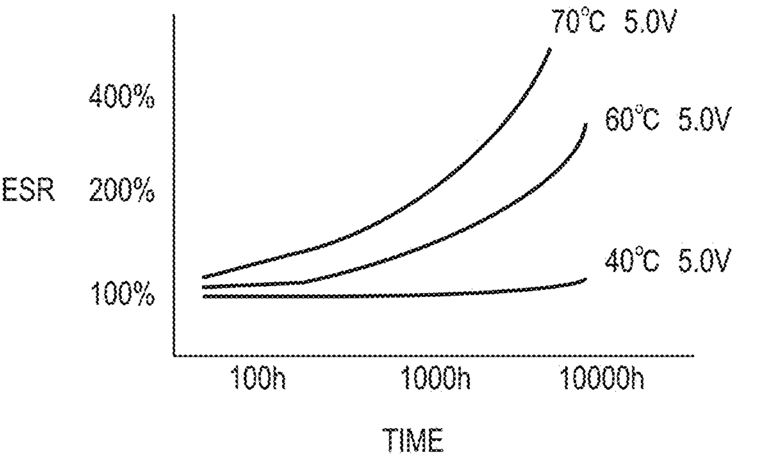
F I G. 6C
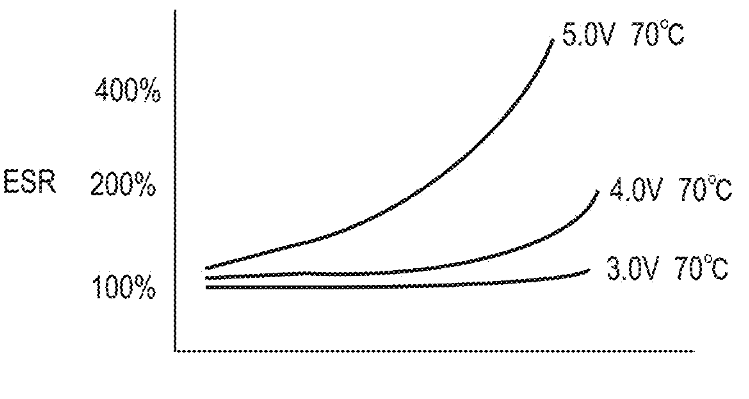

FIG. 8A

MAIN POWER SOURCE PATH (SETTING DEPENDING ON TEMPERATURE)

| | TEMPERATURE OF POWER STORAGE DEVICE UNIT | | | | | | | | | | | |
|---|---|---|---|---|---|---|---|---|---|---|---|---|
| | 20°C OR HIGHER | | | | 0°C OR HIGHER; LESS THAN 20°C | | | | LESS THAN 0°C | | | |
| | PATH SETTING | | | | | | | | | | | |
| | THROUGH | A | B | C | THROUGH | A | B | C | THROUGH | A | B | C |
| GLOBAL SHUTTER MODE (IMAGE CAPTURING) | – | – | ○ | ○ | – | – | ○ | – | – | – | – | ○ |
| OTHER STILL IMAGE MODE (IMAGE CAPTURING) | – | ○ | – | ○ | – | ○ | – | – | – | – | ○ | – |
| MOVING IMAGE MODE OR STILL IMAGE MODE (LV) | ○ | – | – | – | ○ | – | – | – | ○ | – | – | – |

(EXAMPLE)

THROUGH: 0Ω

A:100mΩ

B:200mΩ

C:300mΩ

(WARNING)

LV: LIVE VIEW STATE

FIG. 8B

MAIN POWER SOURCE PATH (SETTING DEPENDING ON ESR)

| | ESR OF POWER STORAGE DEVICE UNIT | | | | | | | | | | | | | | | |
|---|---|---|---|---|---|---|---|---|---|---|---|---|---|---|---|---|
| | LOW (LESS THAN 100mΩ) | | | | MEDIUM (100mΩ OR MORE; LESS THAN 400mΩ) | | | | LARGE (400mΩ OR MORE; LESS THAN 600mΩ) | | | | NG (600mΩ OR MORE) | | | |
| | PATH SETTING | | | | | | | | | | | | | | | |
| | THROUGH | A | B | C | THROUGH | A | B | C | THROUGH | A | B | C | THROUGH | A | B | C |
| GLOBAL SHUTTER MODE (IMAGE CAPTURING) | – | – | ○ | ○ | – | – | ○ | – | – | – | – | ○ | PROHIBIT USAGE | | | |
| OTHER STILL IMAGE MODE (IMAGE CAPTURING) | – | ○ | – | ○ | – | ○ | – | – | – | – | ○ | – | – | – | – | ○ |
| MOVING IMAGE MODE OR STILL IMAGE MODE (LV) | ○ | – | – | – | ○ | – | – | – | ○ | – | – | – | ○ | – | – | – |
| ESR MEASUREMENT MODE | – | – | ○ | – | – | – | ○ | – | – | – | ○ | – | – | – | ○ | – |

FIG. 8C

CHARGE CONTROL

| | CHARGE VOLTAGE | | MAXIMUM CHARGING CURRENT |
|---|---|---|---|
| | TEMPERATURE ≤Ta | >Ta | |
| GLOBAL SHUTTER MODE (IMAGE CAPTURING) | 5.0V | 5.0V | 100mA |
| GLOBAL SHUTTER MODE (LV) | 4.5V | 2.0V | 300mA |
| OTHER STILL IMAGE MODE (IMAGE CAPTURING) | 4.5V | 4.5V | 100mA |
| OTHER STILL IMAGE MODE (LV) | 4.5V | 2.0V | 300mA |
| MOVING IMAGE MODE | 2.0V | | 100mA |
| ESR MEASUREMENT MODE | 4.5V | | 100mA |
| CAMERA OFF | 0.0V | | — |

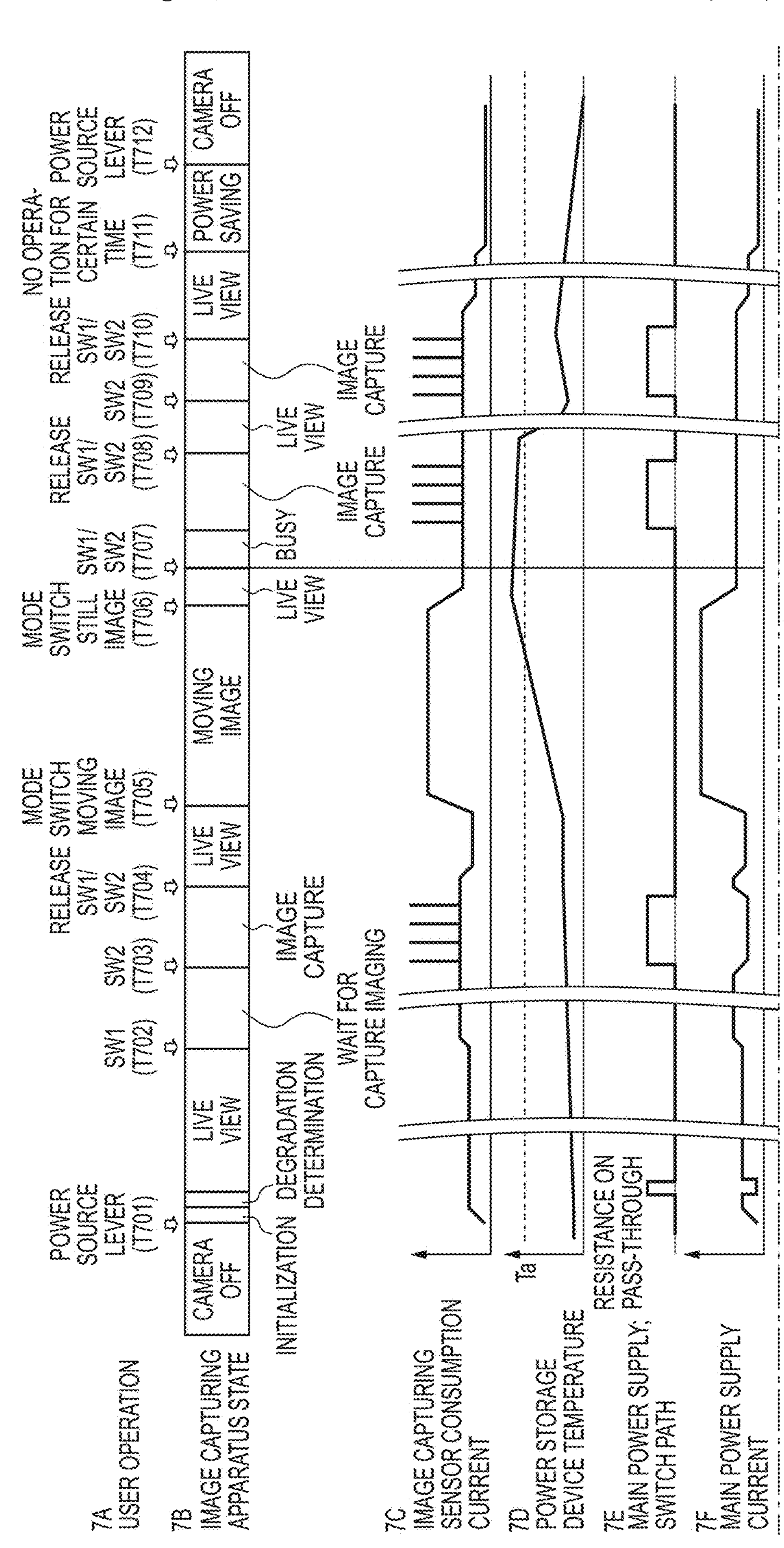
F I G. 9A
7A
USER OPERATION
7B
IMAGE CAPTURING APPARATUS STATE
7C
IMAGE CAPTURING SENSOR CONSUMPTION CURRENT
7D
POWER STORAGE DEVICE TEMPERATURE
7E
MAIN POWER SUPPLY, PASS-THROUGH SWITCH PATH
7F
MAIN POWER SUPPLY CURRENT
POWER SOURCE LEVER (T701)
SW1 (T702)
SW2 (T703)
RELEASE SW1/ SW2 (T704)
MODE SWITCH MOVING IMAGE (T705)
MODE SWITCH STILL IMAGE (T706)
SW1/ SW2 (T707)
RELEASE SW1/ SW2 (T708)
SW2 (T709)
RELEASE SW1/ SW2 (T710)
NO OPERATION FOR CERTAIN TIME (T711)
POWER SOURCE LEVER (T712)
CAMERA OFF
LIVE VIEW
LIVE VIEW
MOVING IMAGE
LIVE VIEW
POWER SAVING
CAMERA OFF
INITIALIZATION
DEGRADATION DETERMINATION
WAIT FOR CAPTURE IMAGING
IMAGE CAPTURE
LIVE VIEW
BUSY
IMAGE CAPTURE
LIVE VIEW
IMAGE CAPTURE
Ta
RESISTANCE ON
PASS-THROUGH

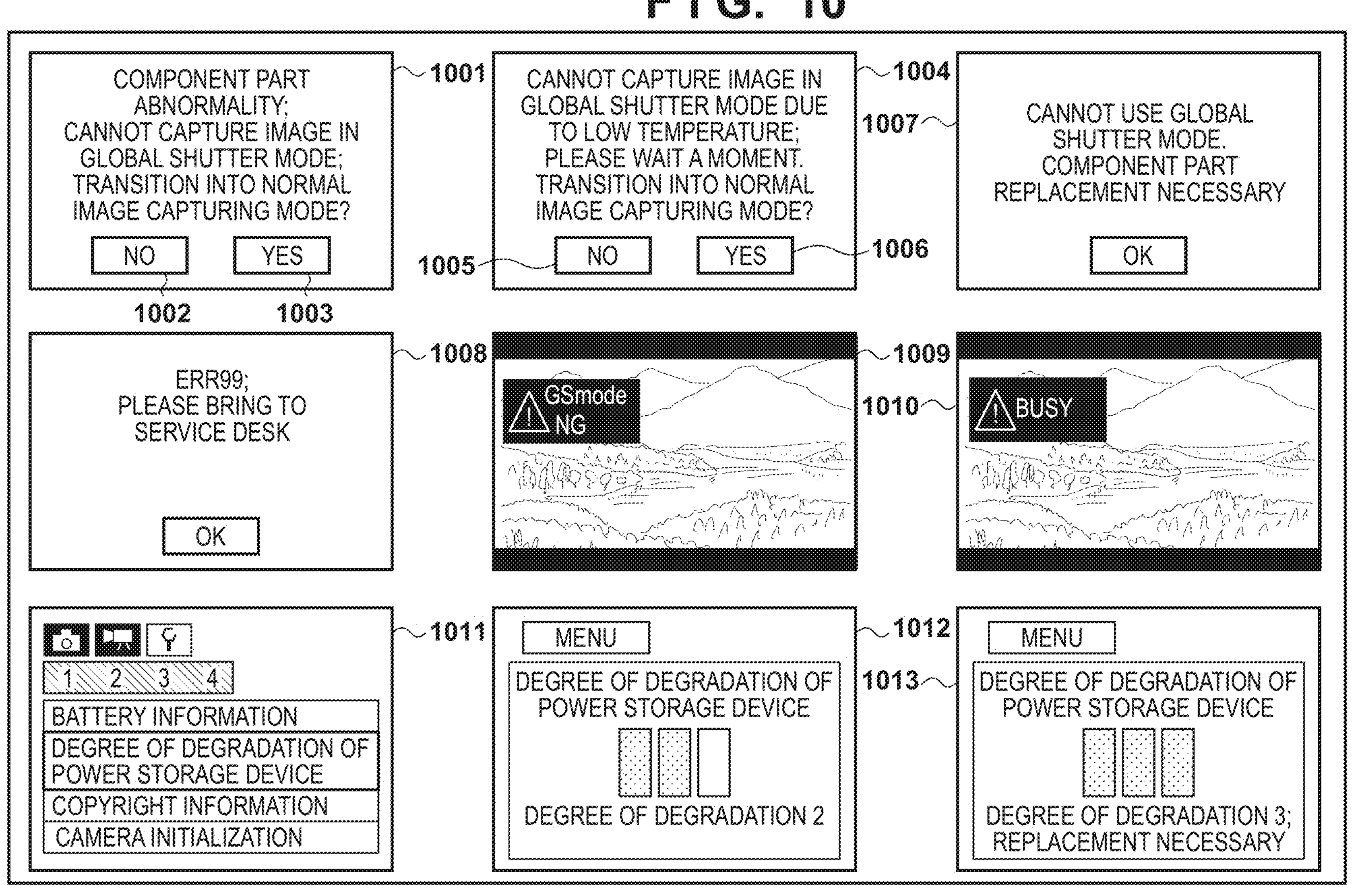
F I G. 10
1001
COMPONENT PART ABNORMALITY; CANNOT CAPTURE IMAGE IN GLOBAL SHUTTER MODE; TRANSITION INTO NORMAL IMAGE CAPTURING MODE?
NO
YES
1002
1003
1004
CANNOT CAPTURE IMAGE IN GLOBAL SHUTTER MODE DUE TO LOW TEMPERATURE; PLEASE WAIT A MOMENT. TRANSITION INTO NORMAL IMAGE CAPTURING MODE?
NO
YES
1005
1006
1007
CANNOT USE GLOBAL SHUTTER MODE. COMPONENT PART REPLACEMENT NECESSARY
OK
1008
ERR99; PLEASE BRING TO SERVICE DESK
OK
1009
GSmode NG
1010
BUSY
1011
1 2 3 4
BATTERY INFORMATION
DEGREE OF DEGRADATION OF POWER STORAGE DEVICE
COPYRIGHT INFORMATION
CAMERA INITIALIZATION
1012
MENU
DEGREE OF DEGRADATION OF POWER STORAGE DEVICE
DEGREE OF DEGRADATION 2
1013
MENU
DEGREE OF DEGRADATION OF POWER STORAGE DEVICE
DEGREE OF DEGRADATION 3; REPLACEMENT NECESSARY

IMAGE CAPTURING APPARATUS, METHOD FOR CONTROLLING SAME, AND STORAGE MEDIUM

BACKGROUND

Technical Field

The aspect of the embodiments relates to a technique for driving a load circuit with a power storage device in an image capturing apparatus.

Description of the Related Art

A known image capturing apparatus can reduce rolling shutter distortion without using a mechanical shutter by installing an image capturing sensor that can simultaneously read out a plurality of pieces of pixel data.

However, when many pieces of pixel data are read out at high-speeds, the peak current of the image capturing sensor increases. When the peak current increases, the current supplied from a battery of the image capturing apparatus may exceed a tolerance value, causing the voltage of the battery to drop and cause a system failure. Also, when the peak current increases, a voltage drop may occur due to line resistance, and if the voltage drops below the minimum drive voltage of the image capturing apparatus, a system failure may occur.

A conceivable way of avoiding a system failure includes stopping the operations of the image capturing apparatus before the battery voltage becomes equal to or less than a predetermined value. However, in this case, the operable time of the image capturing apparatus is significantly reduced.

As described above, a known method for handling an increase in peak current includes reducing a current supplied from the battery by supplying a current from a power storage device such as an electric double layer capacitor or the like.

However, a power storage device such as an electric double layer capacitor or the like has the properties of degrading in terms of electrical characteristics and increasing in terms of equivalent series resistance (ESR) when a voltage is applied to a long period of time in a high-temperature environment. When ESR increases, the power supply from the power storage device is reduced, causing the peak current supplied from the battery unable to be sufficiently reduced.

To prevent degradation of the power storage device, a technique relating to power storage device charge control is known. For example, in Japanese Patent Laid-Open No. 2009-261147, only when a signal to start driving a load circuit is input, a power storage device is charged to a predetermined voltage, and while on standby, the charge voltage is decreased. In this manner, degradation of the power storage device during standby is prevented.

However, with the technique described in Japanese Patent Laid-Open No. 2009-261147, during the period in which the load drive circuit is used, a high voltage is continually applied to the power storage device. Thus, when continuously used in a high-temperature environment, the power storage device is degraded and the ESR is increased.

SUMMARY

According to a first aspect of the embodiment, there is provided an apparatus comprising: a load circuit; a power source; a storage device; a charging unit that uses power from the power source to charge the storage device; at least one processor; and a memory coupled to the at least one processor storing instructions that, when executed by the at least one processor, cause the at least one processor to function as: a detection unit that detects a temperature of the storage device, a control unit that controls power supply to the load circuit according to a state of the apparatus, wherein the control unit, in a first state of the apparatus, performs control so that power is supplied from the power source to the load circuit without power being supplied from the storage device to the load circuit and, in a second state of the apparatus in which a maximum power consumption of the load circuit is greater than in the first state, performs control so that power is supplied from the power source and the storage device to the load circuit, and the control unit sets a charging complete voltage of the storage device via the charging unit depending on the detected temperature.

According to a second aspect of the embodiment, there is provided a method for controlling an apparatus including a load circuit, a power source that supplies power to the load circuit, and a storage device that supplies power to the load circuit, the method comprising: charging the storage device using power from the power source; detecting a temperature of the storage device; controlling power supply to the load circuit, wherein in a first state of the apparatus, control is performed so that power is supplied from the power source to the load circuit without power being supplied from the storage device to the load circuit and, in a second state in which a maximum power consumption of the load circuit is greater than in the first state, control is performed so that power is supplied from the power source and the storage device to the load circuit, and in the charging, a charging complete voltage of the storage device is changed depending on the detected temperature.

Further features of the disclosure will become apparent from the following description of exemplary embodiments with reference to the attached drawings.

BRIEF DESCRIPTION OF THE DRAWINGS

FIG. 1 is a diagram illustrating a block configuration of an image capturing apparatus according to an embodiment of the disclosure.

FIGS. 4A and 4B are diagrams illustrating a more detailed block configuration of the image capturing power source unit.

FIG. 5A is a flowchart illustrating operations of the image capturing power source unit.

FIG. 5B is a flowchart illustrating operations of the image capturing power source unit.

FIGS. 6A to 6C are diagrams illustrating the characteristics of a power storage device unit.

FIGS. 8A to 8C are diagrams illustrating settings for a main power source path switching unit and a power storage device charging and discharging unit.

FIGS. 9A and 9B are timing charts indicating the transitions of states of the image capturing apparatus.

FIG. 10 is a diagram illustrating notification screens for a user.

DESCRIPTION OF THE EMBODIMENTS

Figure 2:
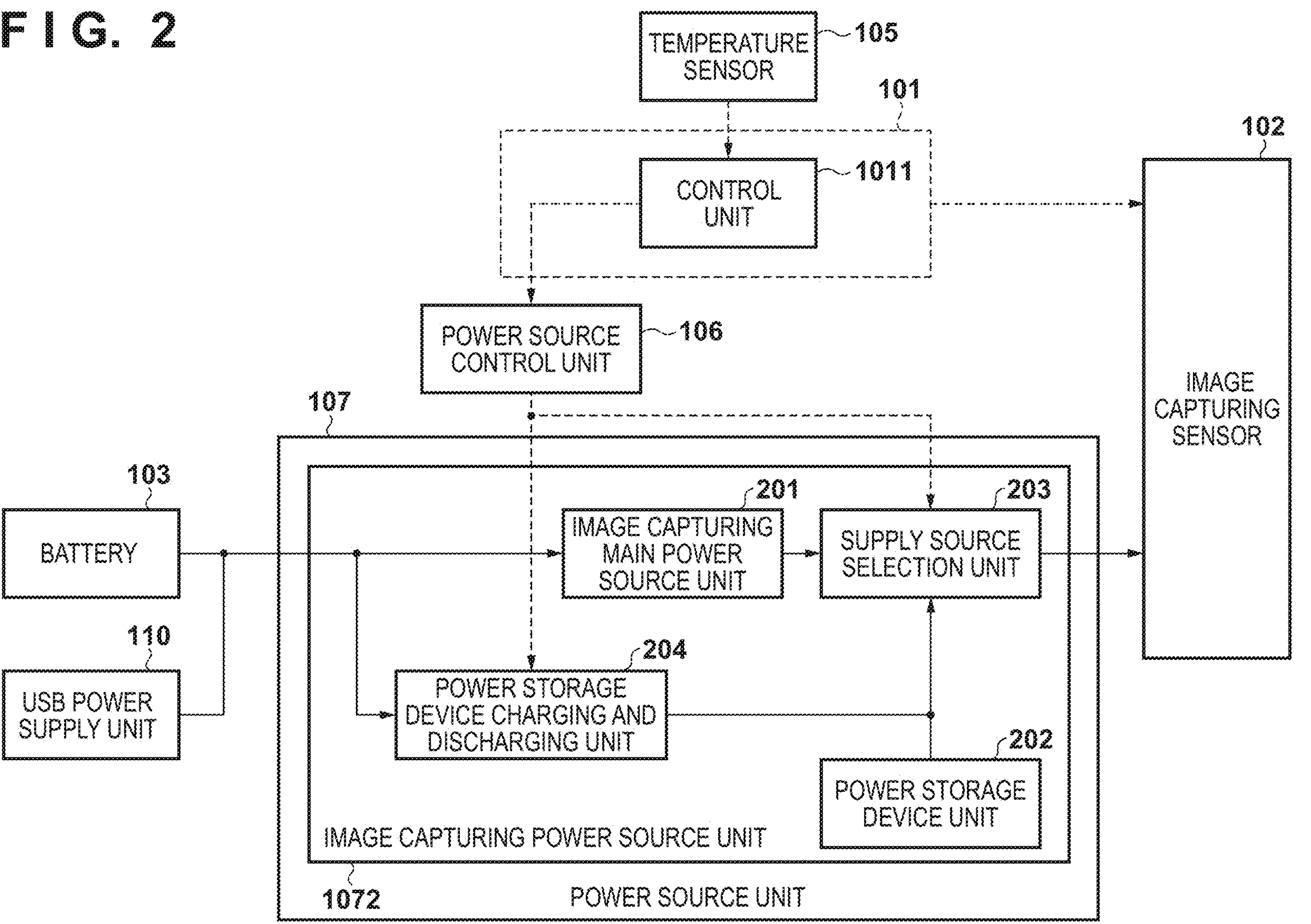
FIG. 2 is diagram illustrating a block configuration of an image capturing power source unit.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

FIG. 1 is a block diagram illustrating the configuration of an image capturing apparatus 100 according to an embodiment of the disclosure.

In FIG. 1, an image capturing drive control unit 1012 that receives commands from a control unit 1011 in a CPU 101 that performs overall control of the image capturing apparatus 100 controls an image capturing sensor 102 on the basis of these commands. The image capturing sensor 102 controlled in this manner performs photoelectric conversion (exposure) by each pixel capturing light from a subject and converts (reads out) these signals into digital data via an A/D converter in the image capturing sensor 102.

The image data generated on the basis of the digital data obtained from each pixel is put into a temporary memory 1014 in the CPU 101. In the case of an image capturing standby state in which a live view image is displayed, the data taken in from the image capturing sensor 102 is stored in the temporary memory 1014 in response to a decimation drive command for live view image form the control unit 1011. After the obtained image is corrected by an image correction unit 1015, the image is converted into data for display by a display image conversion unit 1016 and then displayed on a display unit 103 as a live view image.

When the user presses a release button on a non-illustrated operation unit and enters a still image capture instruction, the control unit 1011 instructs the image capturing drive control unit 1012 to capture a still image for recording. The image data is output from the image capturing sensor 102 driven and controlled so that the still image data for recording is captured according to an instruction from the control unit 1011. The image data stored on the temporary memory 1014 is corrected by the image correction unit 1015, JPEG compression processing is executed by an image compression unit 1013, and then the image is recorded as a still image in a recording unit 104.

When the user presses a record moving image button on a non-illustrated operation unit and enters a moving image capture instruction, the control unit 1011 instructs the image capturing drive control unit 1012 to capture a moving image for recording. A plurality of frames of image data constituting a moving image is continuously output from the image capturing sensor 102 driven and controlled so that the moving image data for recording is captured according to an instruction from the control unit 1011. Each frame of the image data stored on the temporary memory 1014 is corrected by the image correction unit 1015, moving image compression processing is executed by the image compression unit 1013, and then the image is recorded as a moving image in the recording unit 104. Note that though not illustrated in FIG. 1, the image capturing apparatus 100 includes an operation unit for the input of user operations and the like.

The image capturing apparatus 100 has a plurality of operation modes. Examples of these modes include a still image mode and a moving image mode. Specifically, among the still image modes, there is a single shot mode in which a single still image is captured per press of the release button and a continuous shooting mode (continuous image capturing mode) in which still images are continuously obtained while the release button is being pressed. Among the continuous shooting modes, there is a high-speed continuous shooting mode in which a higher number of images are captured per unit time and a low-speed continuous shooting mode in which a relatively low number of images are captured per unit time.

Also, in addition to the single shot mode and the continuous shooting mode, other types include a high-speed readout mode in which a still image is obtained with distortion of a moving subject suppressed by simultaneously reading out a higher number of pixels of the image capturing sensor 102 and a low-speed readout mode in which the number of pixels simultaneously read out is suppressed. In particular, among the high-speed readout modes, there is a global shutter mode in which all of the pixels are read out at once.

Among the moving image modes, the operation modes of the image capturing apparatus 100 can be classified by recording moving image format and include 8K recording mode, 4K recording mode, FHD recording mode, and the like. In the moving image mode, the frame rate can also be changed, and the operation modes of the image capturing apparatus 100 may be classified by this. The operation mode of the image capturing apparatus 100 may be changed in response to a user operation, or the control unit may automatically change the operation mode to the optimal operation mode.

A power source unit 107 converts the power supplied from a battery 108 or a USB power supply unit 110 into the required voltage and current and supplies it to each block. The battery 108 corresponds to the power supply source of the image capturing apparatus 100 and may be a removable lithium ion battery, for example.

A battery monitoring unit 109 monitors the voltage and discharge current of the battery 108 and transmits information to the control unit 1011. The battery monitoring unit 109 can calculates the internal resistance of the battery 108 from the discharge current and the voltage drop amount of the battery 108. On the basis of the battery information provided by the battery monitoring unit 109, the control unit 1011 changes control to put the state of the image capturing apparatus 100 in a low-power-consumption state when the remaining power of the battery 108 is low or the internal resistance is rising.

The image capturing apparatus 100 can also operate using the power supplied from the USB power supply unit 110 instead of the power from the battery 108. The USB power supply unit 110 is an external power supply apparatus. The USB power supply unit 110 is a power bank or an AC adapter with a USB cable, for example. The USB power supply unit 110 is connected to the image capturing apparatus 100 via a non-illustrated USB Type-C connector. When connected to the image capturing apparatus 100, the USB power supply unit 110 supplies power to the image capturing apparatus 100 according to the USB Power Delivery protocol. The power source unit 107 receives power supplied from the USB power supply unit 110 according to the USB PD protocol. In FIG. 1, in the power source unit 107, a CPU power source unit 1071 that supplies power to the CPU 101 and an image capturing power source unit 1072 that supplies power to the image capturing sensor 102, which is the load circuit for the power source, are illustrated. However, a power source that supplies power to the display unit 103, the recording unit 104, or another block may be included.

A power source control unit 106 controls the power source unit 107 on the basis of commands from the control unit 1011. For example, controlling on/off, changing the output voltage, and the like can be performed for each power source in the power source unit 107 by the power source control unit 106. In FIG. 1, the power source control unit 106 is illustrated as a separate circuit configuration to the CPU 101, but the function of the power source control unit 106 may be included in the CPU 101. In another configuration, the control unit 1011 may directly control the power source unit 107.

A temperature sensor (temperature detecting unit) 105 is disposed in the image capturing apparatus 100. The temperature sensor 105 detects the temperature at or near the temperature sensor 105 and outputs temperature information indicating the detected temperature. The control unit 1011 can estimate the temperature of any section of the image capturing apparatus 100 on the basis of temperature information output from the temperature sensor 105. Also, the temperature sensor 105 is not limited to one, and two or more temperature sensors 105 may be provided at different positions in the image capturing apparatus 100. The control unit 1011 can more specifically estimate the temperature of the image capturing apparatus 100 on the basis of the temperature information from the two or more temperature sensors.

The control unit 1011 can change the control of the image capturing apparatus 100 according to the temperature information from the temperature sensor 105. The control unit 1011 estimates the temperature of the image capturing sensor 102 on the basis of the temperature information from the temperature sensor 105. In a case where the temperature of the image capturing sensor 102 exceeds a predetermined temperature, a command is sent to the image capturing drive control unit 1012 to stop the image capturing operations. Simultaneously, the control unit 1011 sends the power source control unit 106 a command to switch off the image capturing power source unit 1072. Accordingly, when the temperature of the image capturing sensor 102 is outside of the temperature range within which the image capturing sensor can be used, the operations of the image capturing apparatus 100 can be safely stopped.

FIG. 2 is a block diagram illustrating the configuration relating to the image capturing power source unit 1072 according to the present embodiment. The power with the battery 108 or the USB power supply unit 110 as the supply source is input to an image capturing main power source unit 201 and a power storage device charging and discharging unit 204. At the image capturing main power source unit 201, the voltage of the battery 108 is converted to the operating voltage of the image capturing sensor 102 and output. The image capturing main power source unit 201 is a DC/DC converter or a low-dropout (LDO) regulator, for example.

Also, the power storage device charging and discharging unit 204 controls the processing for charging a power storage device unit 202 using the power from the battery 108 or the USB power supply unit 110. The power storage device unit 202 is an electric double layer capacitor (EDLC), for example. It is sufficient that the power storage device unit 202 has a capacity large enough to provide all of the drive power of the image capturing sensor 102 and has a low equivalent series resistance (ESR) that can handle the reaction speed of the image capturing sensor 102. The power storage device unit 202 may be a solid-state battery power storage device, for example. A supply source selection unit 203 selects at least one of the image capturing main power source unit 201 and the power storage device unit 202 and supplies power to the image capturing sensor 102.

The supply source selection unit 203 is controlled by the power source control unit 106 such that the power of the battery 108 or the USB power supply unit 110 via the image capturing main power source unit 201 is supplied mainly to the image capturing sensor 102. However, if the power of the battery 108 or the USB power supply unit 110 is made to completely cover the power consumption of the image capturing sensor 102, the tolerable power of the battery 108 or the USB power supply unit 110 may be exceeded. For example, in a case where the operation mode of the image capturing apparatus 100 is the global shutter mode, the image capturing sensor 102 consumes a large amount of power in an instant to simultaneously read out all of the pixels. Here, there is a high possibility that the tolerable output current of the battery 108 or the USB power supply unit 110 is exceeded. Thus, for operation modes with a larger maximum power such as the global shutter mode, the supply source selection unit 203 is controlled such that the power of the power storage device unit 202 is supplied to the image capturing sensor 102. Operation modes with a possibility of the power consumption of the image capturing sensor 102 exceeding the tolerable current of the battery 108 or the USB power supply unit 110 include, not only the global shutter mode, but also a mode in which a plurality of pixels are simultaneously read out, cases of increase the read out speed for high-speed continuous shooting, and the like.

In a case where the power accumulated in the power storage device unit 202 is consumed by the image capturing sensor 102, an instantaneous large current is not taken out from the battery 108 or the USB power supply unit 110. Note that the output of one of the image capturing main power source unit 201 and the power storage device unit 202 is supplied to the image capturing sensor 102 by the supply source selection unit 203. However, the power does not necessarily need to be supplied from one, and the power may be supplied from both to the image capturing sensor 102.

Here, in a case where the power storage device charging and discharging unit 204 performs a constant current charge to the power storage device unit 202, the output current of the power storage device charging and discharging unit 204 is made constant, and the output voltage is changed to match the increase in the voltage of the power storage device unit 202. When the voltage of the power storage device unit 202 reaches the charging complete voltage, the charging operation is stopped.

At this time, the output voltage and the output current of the power storage device charging and discharging unit 204 and the charging complete voltage can be changed by the power source control unit 106. For example, by setting the output current of the power storage device charging and discharging unit 204 to a large value, the time taken to fully charge the power storage device unit 202 can be reduced. On the other hand, by setting the output current to a large value, the power taken out from the battery 108 or the USB power supply unit 110 increases. Thus, by setting the output current value of the power storage device charging and discharging unit 204 to a small value, the power taken out from the battery 108 or the USB power supply unit 110 can be reduced.

Also, by setting the charging complete voltage of the power storage device charging and discharging unit 204 to a high value, more power can be accumulated in the power storage device unit 202 and supplied to the image capturing sensor 102. On the other hand, by setting the charging complete voltage to a high value, degradation of the power storage device unit 202 due to a high voltage being applied to the power storage device unit 202 for a long amount of time can progress. Thus, by setting the charging complete voltage of the power storage device charging and discharging unit 204 to a low value, degradation can be prevented.

Note that in the example described here, the power storage device charging and discharging unit 204 performs constant current charging of the power storage device unit 202. However, constant voltage charging may be performed, and in this case, the maximum value for the charge voltage and the charge current and the like can be changed by the power source control unit 106.

Note that the power storage device charging and discharging unit 204, in addition to the power storage device unit 202 charging function, may have a discharge function for preventing overcharge of the power storage device unit 202.

Figure 3:
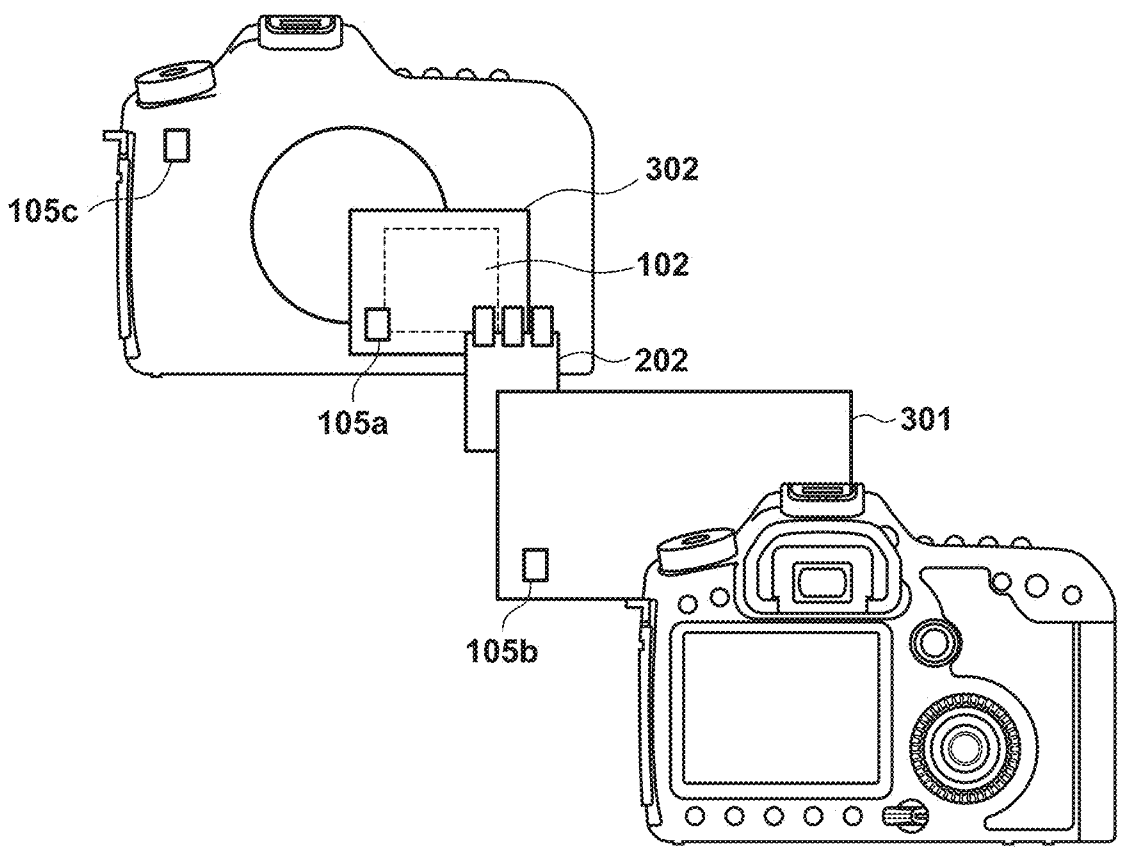
FIG. 3 is a diagram illustrating a structure of the image capturing apparatus.

Next, FIG. 3 is a diagram for describing the configuration of the image capturing apparatus 100 according to the present embodiment.

In FIG. 3, a main substrate 301 and an image capturing sensor substrate 302 are disposed in the casing of the image capturing apparatus 100. The CPU 101 and the power source unit 107 are mounted on the main substrate 301. The image capturing sensor 102 is mounted on the image capturing sensor substrate 302. The image capturing sensor substrate 302 is disposed on the side closer to the lens than the main substrate 301 so that the light can be efficiently taken in by the image capturing sensor 102.

The image capturing sensor substrate 302 is connected to the main substrate 301 via flexible printed circuits (FPC), a connector, or the like. In this manner, the control signals from the CPU 101 and the power from the image capturing power source unit 1072 are supplied to the image capturing sensor 102. The power storage device unit 202 may be mounted on the main substrate 301 or mounted on the image capturing sensor substrate 302. In a case where the power storage device unit 202 is mounted on the image capturing sensor substrate 302, the impedance between the image capturing sensor 102 and the power storage device unit 202 is decreased. This is advantageous in that the power of the power storage device unit 202 can be easily supplied to the image capturing sensor 102.

Also, a temperature sensor 105*a* is a temperature sensor disposed on the image capturing sensor substrate 302, a temperature sensor 105*b* is a temperature sensor disposed on the main substrate 301, and a temperature sensor 105*c* is a temperature sensor attached to the casing of the image capturing apparatus 100. The temperature of any section of the image capturing apparatus 100 can be estimated on the basis of the output data of the temperature sensors 105*a* to 105*c*.

As the power storage device unit 202 is exposed to high-temperature environments, degradation progresses, meaning that it is important to manage the temperature of the power storage device unit 202. For example, in a case where the power storage device unit 202 is mounted on the image capturing sensor substrate 302, the temperature detected by the temperature sensor 105*a* is used to monitor the temperature of the image capturing sensor 102 so that it does not go outside the usable range for the image capturing sensor 102. In addition, the temperature detected by the temperature sensor 105*a* is also used for estimating the temperature of the power storage device unit 202. Also, in a case where the power storage device unit 202 is mounted on the main substrate 301, for example, the temperature detected by the temperature sensor 105*b* disposed at or near the power storage device unit 202 is used for estimating the temperature of the power storage device unit 202. In a case where the temperature sensor 105*b* cannot be disposed at or near the power storage device unit 202, the positional relationship between the temperature sensor 105*a* and the power storage device unit 202 and the temperature detected by the temperature sensor 105*a* can be used to estimate the temperature of the power storage device unit 202 on the main substrate 301.

FIGS. 4A and 4B are block diagrams illustrating the configuration of the supply source selection unit 203 according to the present embodiment.

FIG. 4A illustrates the supply source selection unit 203 and the surrounding configuration. With this configuration, impedance of the power supply path (main power source path), which is a path from the image capturing main power source unit 201 to the image capturing sensor 102 via the supply source selection unit 203, can be switched. The supply source selection unit 203 includes a main power source path switching unit 401, a resistor 402, a power storage device path switching unit 403, and a main power source current detection unit 404. The power source control unit 106 performs control to switch on and off each switch of the main power source path switching unit 401 and the power storage device path switching unit 403.

In an operation mode in which the maximum power consumption of the image capturing apparatus 100 is relatively large, for example, when in an image capturing operation for global shutter mode, the switch of the power storage device path switching unit 403 is controlled to be on. With this control, the power supply path (power storage device path) from the power storage device unit 202 to the image capturing sensor 102 is controlled to be on. The power storage device unit 202 is charged before the image capturing operation so that the voltage of the power storage device unit 202 is higher than the voltage of the image capturing main power source unit 201. Thus, in one embodiment, the power can be supplied from the power storage device unit 202 to the image capturing sensor 102 at the time of image capturing operations.

However, when the power is supplied from the power storage device unit 202 to the image capturing sensor 102, the voltage of the power storage device unit 202 drops. In addition, the voltage of the power storage device unit 202 drops in proportion to the current amount taken out from the power storage device unit 202 due to the equivalent series resistance (ESR) of the power storage device unit 202.

In FIG. 4A, as an example of the configuration circuit of the power storage device path switching unit 403, a diode is disposed so that when the switch of the power storage device path is switched on, the power storage device is not charged from the image capturing main power source unit 201. The voltage on the power storage device path side drops even with such components.

When the voltage output from the power storage device path drops, at the junction of the path from the image capturing main power source unit 201 via the main power source path switching unit 401 and the path from the power storage device unit 202, the voltage of the main power source path and the voltage of the power storage device path have the same potential. In this state, in one embodiment, the power is supplied to the image capturing sensor 102 from the path with the smaller impedance. With the main power source path switching unit 401 in a pass-through state, when the impedance of the main power source path from the image capturing main power source unit 201 is sufficiently low, even if the power storage device path is on, the power is supplied to the image capturing sensor 102 from the image capturing main power source unit 201.

One method of resolving this matter includes switching the switch so that the current on the main power source path side is limited. Specifically, each switch of the main power source path switching unit 401 may be controlled so that the impedance of the main power source path is greater than the impedance of the power storage device path including the ESR of the power storage device unit 202. At the main power source path switching unit 401, the switching of each switch may be controlled so that one of the resistor 402*a* to 402*c* is disposed in series on the main power source path. In this manner, even if the voltage of the power storage device unit 202 drops, in one embodiment, the power can be continuously supplied from the power storage device unit 202 to the image capturing sensor 102.

Note that when the power storage device path is switched on with the power storage device unit 202 charged at a voltage higher than that of the image capturing main power source unit 201, the current may backflow to the output of the image capturing main power source unit 201. Thus, in one embodiment, the image capturing main power source unit 201 or the switch disposed in series with the main power source path has a backflow prevention function.

The resistor 402 includes a resistors 402*a*, 402*b*, 402*c* with a different resistance values, the resistor 402*b* having a larger value than the resistor 402*a* and the resistor 402*c* having a larger value than the resistor 402*b*. The optimal resistor is selected depending on the situation. In FIG. 4A, the main power source path switching unit 401 has four paths of different impedance. However, this number is not limited, and by changing the combination of on switches, the path combined impedance may be changed.

To reduce the unnecessary loss generated by the resistor 402, in one embodiment, the resistance value of the resistor 402 is as small as possible even when giving priority to power supply from the power storage device unit 202. Thus, in the initial period of any operation mode method, the image capturing apparatus 100 switches path A with a relatively small resistance value to on.

However, since the impedance of the main power source path is relatively low when the impedance of the power storage device path increases, as a result, the required power is not supplied from the power storage device unit 202. An example of when the impedance of the power storage device path increases is when the power storage device unit 202 is a low temperature. When the power storage device unit 202 is a low temperature, the ESR tends to increase.

Regarding this, the control unit 1011 controls the power source control unit 106 on the basis of the temperature detected by the temperature sensor 105 and performs control so that the impedance of the main power source path is changed by the main power source path switching unit 401. Specifically, the control unit 1011 estimates the temperature of the power storage device unit 202 on the basis of the temperature detected by the temperature sensor 105. The power source control unit 106 performs control so that the main power source path switching unit 401 switches to path B or path C depending on the impedance of the power storage device path corresponding to the estimated temperature. In this manner, even when the impedance of the power storage device path increases due to low temperatures, the required power can be supplied from the power storage device unit 202.

A state in which the path A is selected is referred to as a first supply mode, and a more current-limiting state in which the path B or path C is selected is referred to as a second supply mode. In the present embodiment, a configuration in which three paths are switched between is used. However, a configuration in which two or more main power source paths can be switched between can be used.

A plausible reason for the increase in the impedance of the power storage device path may be an increase in the ESR of the power storage device unit 202 due to degradation or the like, in addition to the temperature characteristics of the power storage device unit 202. Thus, in one embodiment, the impedance of the power storage device path is measured. By detecting the current of the main power source path, the impedance of the power storage device path can be calculated. Thus, the supply source selection unit 203 includes the main power source current detection unit 404.

The main power source current detection unit 404 can calculate the current flowing through the main power source path from the difference in voltage across both ends of the resistor 402. In a case where the current at the read-out time of the image capturing sensor 102 is known to be 3 A, for example, if the current flowing through the main power source path is 1 A, then the current flowing through the power storage device path is 2 A. The current ratio is set as the ratio between the impedance of the main power source path and the impedance of the power storage device path. At this time, if the main power source path is the path A, half of resistance A can be calculated as the impedance of the power storage device path. Control is performed to switch to the path B or the path C depending on the impedance of the power storage device path calculated in this manner. In this manner, even when the impedance of the power storage device path increases due to degradation of the power storage device unit 202, the required power can be supplied from the power storage device unit 202.

A method other than measuring the impedance of the power storage device path by detecting the current of the main power source path includes, for example, disposing a component that calculates the impedance of the power storage device path on a switch on the power storage device path switching unit 403. The impedance of the power storage device path can be measured from the current flow through the power storage device path and the voltage. In another example, a component that calculates the impedance of the power storage device path may be disposed on the power storage device charging and discharging unit 204. The impedance of the power storage device path can be measured from the amount of voltage drop of the power storage device unit 202 upon a discharge at a constant current.

When the impedance of the main power source path increases, disadvantageously, loss in the main power source path increases. Also, in a case where the power storage device path is in the on state, irrespective of whether or not power supply from the power storage device unit 202 to the image capturing sensor 102 is used, power is supplied from the power storage device unit 202 to the image capturing sensor 102. Thus, unnecessary charging and discharging occurs at the power storage device unit 202, resulting in a decrease in the battery retention of the battery 108.

Regarding this, in an operation mode in which the maximum power of the image capturing apparatus 100 is relatively low and that operates within the tolerable power of the battery 108 or the USB power supply unit 110, the main power source path switching unit 401 is controlled so that the impedance of the main power source path is reduced. In this manner, the loss in the main power source path can be kept to a minimum. Also, to reduce the impedance of the main power source path, in a case where the voltage of the main power source path and the voltage of the power storage device path have the same potential, power is supplied from the image capturing main power source unit 201 to the image capturing sensor 102. As a result, the unnecessary charging and discharging of the power storage device unit 202 is reduced, and the battery retention of the battery 108 can be improved.

In addition, a configuration may be used in which control is performed so that the switch of the power storage device path switching unit 403 is switched off at the same time as the main power source path is switched and the power storage device path is switched off. In this manner, the image capturing sensor 102 can be operated without consuming the power charged in the power storage device unit 202, and a loss due to unnecessary charging and discharging of the power storage device unit 202 can also be prevented.

Operation modes in which the power consumption is relatively low include, for example, a moving image mode, a still image mode such as a single shot mode or a low-speed continuous shooting mode, a low-speed readout mode, and the like. Also, operation modes in which the maximum power consumption of the image capturing apparatus 100 is relatively high include, for example, a global shutter mode, a high-speed continuous shooting mode, and a live view state for a high-speed readout mode.

The main power source path switching unit 401 is not limited to switching depending on the operation mode of the image capturing apparatus 100, and in another configuration, control may be performed to switch the main power source path depending on whether it is the read-out operation time of the image capturing sensor 102 or another time period. For example, the impedance of the main power source path may be controlled to be high in-sync with the read-out operation of the image capturing sensor 102, and the impedance of the main power source path may be controlled to be low in time periods other than the read-out time period. By performing control in this manner, at the time of read-out operation, the current taken out from the battery 108 or the USB power supply unit 110 can be reduced, and the unnecessary loss during the non-read-out time period can be reduced.

FIG. 4B illustrates a configuration in which the main power source path switching unit 401 is substituted with a main power source current limiting unit 406. The main power source current limiting unit 406 performs control so that the current output from the main power source current limiting unit 406 does not exceed a current threshold set by the power source control unit 106. FIG. 4B illustrates an example in which the main power source current limiting unit 406 is a component of the supply source selection unit 203. However, the image capturing main power source unit 201 may have a similar function as the main power source current limiting unit 406. As with the main power source path switching unit 401 illustrated in FIG. 4A, the main power source current limiting unit 406 can change the limited current on the basis of the temperature information from the temperature sensor 105. Also, as with the main power source path switching unit 401 illustrated in FIG. 4A, the current threshold can be changed depending on the operation mode of the image capturing apparatus 100.

A state in which the current output from the main power source path is controlled to a first value is set as the first supply mode, and a state in which the current from the main power source path is controlled to a second value lower than the first value is set as the second supply mode. Also, the first supply mode can be referred to as a state in which the current limiting of the main power source path is weak. The second supply mode can be referred to as a state in which the current limiting of the main power source path is strong. Also, as described above, the first supply mode and the second supply mode is switched between depending on the operation mode of the image capturing apparatus 100. Also, as described above, controlling the switching between the first supply mode and the second supply mode is performed according to information of the temperature sensor 105. Furthermore, as described above, controlling the switching of the first supply mode and the second supply mode is performed by the control unit 1011 according to the ESR. Via such switching operations, the maximum current of the battery 108 or the USB power supply unit 110 can be reduced, and the loss of the image capturing power source unit 1072 can be reduced.

Note that the state in which current limiting of the main power source path is not performed and the state in which current limiting is performed may be switched between the first supply mode and the second supply mode, and the supply mode may be switched so that there are two or more different limiting values.

Also, the state of the battery 108 may be monitored by the battery monitoring unit 109 illustrated in FIG. 4B, and the supply mode may be switched depending on the state of the battery 108. For example, in a case where the voltage of the battery 108 is less than a predetermined value, the mode may be set to the second supply mode. In another example, in a case where the current of the battery 108 is greater than a predetermined value, the mode may be set to the second supply mode. In yet another example, in a case where the internal resistance of the battery 108 is greater than a predetermined value, the mode may be set to the second supply mode. In this manner, the output current of the image capturing main power source unit 201 can be limited to ensure that the tolerable current of the battery 108 is not exceeded, and the image capturing sensor 102 can be operated together with the power from the power storage device unit 202.

As described above with reference to FIGS. 4A and 4B, the impedance of the main power source path is changed depending on the temperature or the ESR of the power storage device unit 202. Here, in a case where the power storage device unit 202 is in an excessively low temperature state, even if the impedance of the main power source path is set to maximum, the impedance of the power storage device path becomes even greater. Thus, in one embodiment, the power is supplied from the image capturing main power source unit 201 to the image capturing sensor 102. At this time, the power consumption of the image capturing sensor 102 may exceed the tolerable power of the battery 108 or the USB power supply unit 110 and cause a system failure.

Regarding this, the control unit 1011 predicts the power to be supplied from the image capturing main power source unit 201 to the image capturing sensor 102 on the basis of the temperature information from the temperature sensor 105. Then, the control unit 1011 performs control so that the image capturing operations of the image capturing apparatus 100 stop in a case where the predicted power exceeds a predetermined value.

Also, if the impedance of each path corresponding to the power source path of the image capturing sensor 102 becomes excessively large, the impedance causes a voltage drop, which may reduce the voltage of each path below the operating voltage of the image capturing sensor 102.

Regarding this, the control unit 1011 predicts the voltage drop amount of the voltage output to the image capturing sensor 102 on the basis of the temperature information from the temperature sensor 105. Then, the control unit 1011 performs control so that the image capturing operations of the image capturing apparatus 100 stop in a case where the predicted voltage drop amount exceeds a predetermined value.

In the example described above, the control unit 1011 stops the image capturing operation of the image capturing apparatus 100 according to information of the temperature sensor 105. However, the control unit 1011 may predict the ESR of the power storage device unit 202 and stop the image capturing operation. In this case, the control unit 1011 predicts the power to be supplied from the image capturing main power source unit 201 to the image capturing sensor 102 from the ESR of the power storage device unit 202, and if the predicted power exceeds a predetermined value, the control unit 1011 performs control to stop the image capturing operation of the image capturing apparatus 100. Also, the control unit 1011 predicts the voltage drop amount of the voltage output to the image capturing sensor 102 from the ESR of the power storage device unit 202, and if the predicted voltage drop amount exceeds a predetermined value, the control unit 1011 performs control to stop the image capturing operation of the image capturing apparatus 100.

Take an example where the still image mode has a larger maximum power than the moving image mode and the power of the power storage device unit 202 is supplied to the image capturing sensor 102 in the still image mode. In this case, if the power storage device unit 202 falls into the state described above, the image capturing operation is stopped when in the still image mode. Also, from among the still image modes, for a high-speed continuous shooting mode, a high-speed readout mode, and a global shutter mode which are expected to have a large amount of power supplied from the power storage device unit 202 to the image capturing sensor 102, the image capturing operation may be stopped.

Figure 5C:
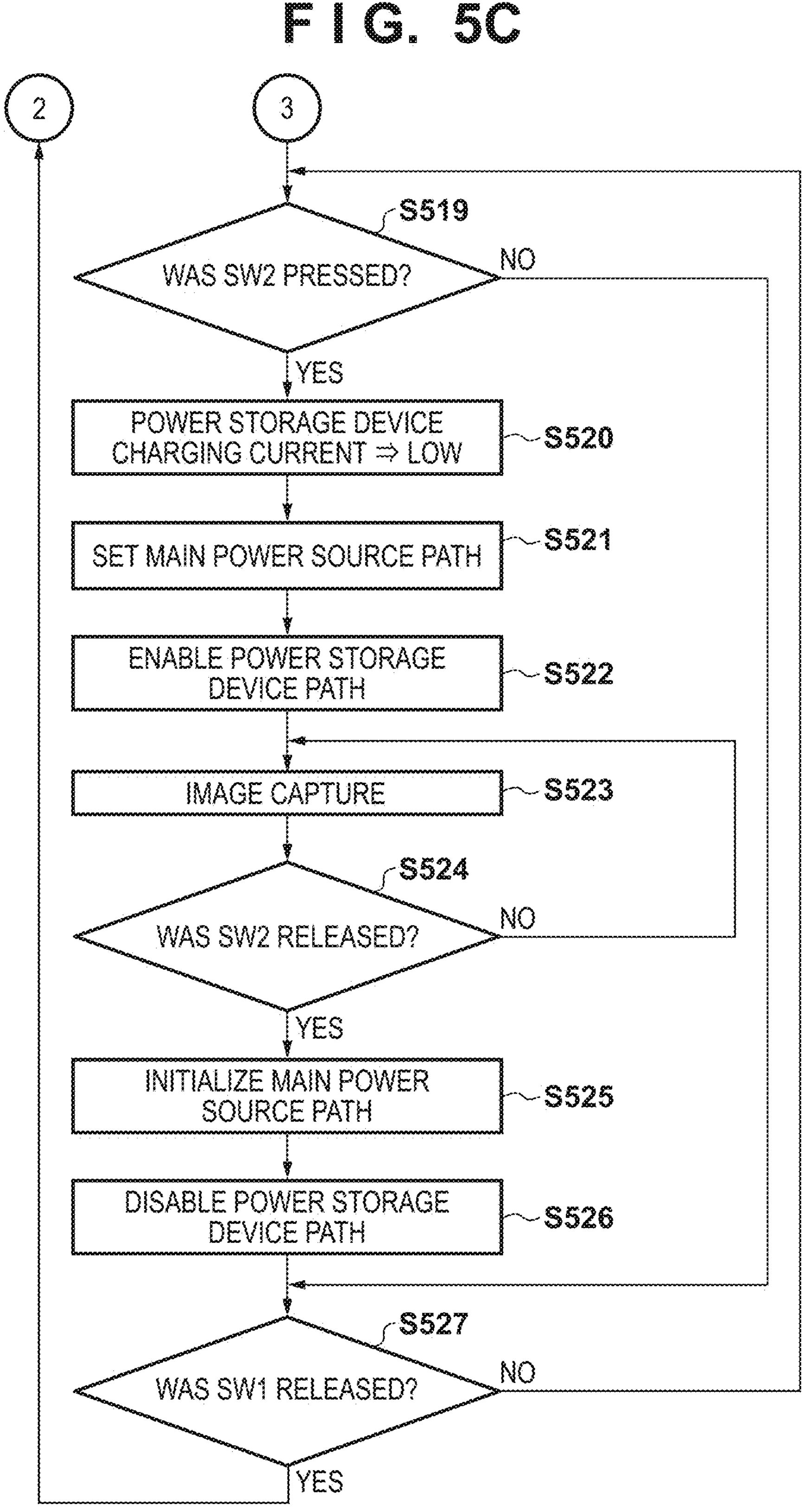
FIG. 5C is a flowchart illustrating operations of the image capturing power source unit.

FIGS. 5A to 5C illustrate a flowchart illustrating the control of the image capturing power source unit 1072 by the control unit 1011 via the power source control unit 106 according to the present embodiment.

For example, when the user presses or operates the power button of the image capturing apparatus 100, in S501, the control unit 1011 executes start-up processing of the image capturing apparatus 100. In the start-up processing of the image capturing apparatus 100, a start-up operation of the power source unit 107 is performed.

Next, in S502, the control unit 1011 executes initialization processing of the main power source path switching unit 401. In the initialization processing, the main power source path is controlled to be in a pass-through state. Accordingly, in the live view state, unnecessary loss in the resistor 402 can be prevented from occurring.

Next, in S503, the control unit 1011 disables the power storage device path. The control unit 1011 controls the power storage device path switching unit 403 and switches it off so that power is not supplied from the power storage device unit 202 to the image capturing sensor 102. Accordingly, loss is prevented from occurring due to unnecessary charging and discharging of the power storage device unit 202 when in the live view state.

Next, in S504, the control unit 1011 executes image capturing start-up processing and sets the image capturing apparatus 100 to an image capturing standby state. Then, the control unit 1011 sets the state to the live view state in which the live view image is displayed on the display unit 103. In the live view state, power is supplied from the image capturing main power source unit 201 to the image capturing sensor 102 via the pass-through path.

Next, in S505, the control unit 1011 predicts the ESR of the power storage device unit 202. The control unit 1011 first controls the main power source path to be the path B. Also, the control unit 1011 performs control to switch on the switch of the power storage device path switching unit 403 to enable the power storage device path. At the same time, the control unit 1011 performs controls so that the power storage device charging and discharging unit 204 charges the power storage device unit 202 to be higher than the output voltage of the image capturing main power source unit 201. Next, the control unit 1011 performs operations so that the consumption current at the image capturing sensor 102 is a known constant value. Here, the main power source current detection unit 404 can detect the current flowing through the main power source path from the difference in voltage across both ends of the resistor 402*a*. The detected main power source path is transmitted to the control unit 1011. The control unit 1011 calculates the current of the power storage device path using the following formula.

Power storage device path=image capturing sensor consumption current−main power source path current (Formula 1)

Next, using the ratio between the power storage device path current and the main power source path current, the ESR of the power storage device unit 202 is predicted using the following formula.

Power storage device ESR=resistance B×(main power source path current/power storage device path current) (Formula 2)

By detecting the current of the main power source path in this manner, the ESR of the power storage device unit 202 can be predicted.

Note that as described above, to predict the ESR of the power storage device unit 202, the consumption current of the image capturing sensor 102 is used. However, a dedicated test circuit with which a load corresponding to a known consumption current is generated may be provided separate from the image capturing sensor. Also, as described above, a method for predicting the ESR of the power storage device unit 202 includes using main power source path current detection. However, predicting the ESR is not limited to using the method and the calculation formulas described above, and other methods and calculation formulas may be used.

After predicting the ESR of the power storage device unit 202 is completed, the control unit 1011 controls the power source control unit 106 so that the main power source path switching unit 401 puts the main power source path in the pass-through state. Also, the control unit 1011 performs control to switch off the switch of the power storage device path switching unit 403 to disable the power storage device path.

Next, in S506, the control unit 1011 estimates the temperature of the power storage device unit 202 on the basis of the temperature information output from the temperature sensor 105.

Then, in S507, the control unit 1011 executes processing to determine the degree of degradation of the power storage device unit 202.

FIGS. 6A to 6C and 7 are diagrams for describing the processing to determine the degree of degradation of the power storage device unit 202.

FIG. 6A illustrates the temperature characteristics of the power storage device unit 202. In FIG. 6A, the horizontal axis represents the temperature, and the vertical axis represents the ESR. When the power storage device unit 202 has a characteristic where the ESR increases at lower temperatures. Also, FIGS. 6B and 6C illustrate the degradation characteristics of the power storage device unit 202. In FIGS. 6B and 6C, the horizontal axis represents the cumulative usage time, and the vertical axis represents the ESR. At the same applied voltage, higher temperatures at this time result in the degradation progressing, and this results in the ESR increasing. Also, at the same temperature, higher applied voltages result in the degradation progressing, and this results in the ESR increasing. In other words, whether the movement of the ESR is due to the temperature characteristics of the power storage device unit 202 or a result of the degradation progressing cannot be known by just identifying the ESR.

Figure 7:
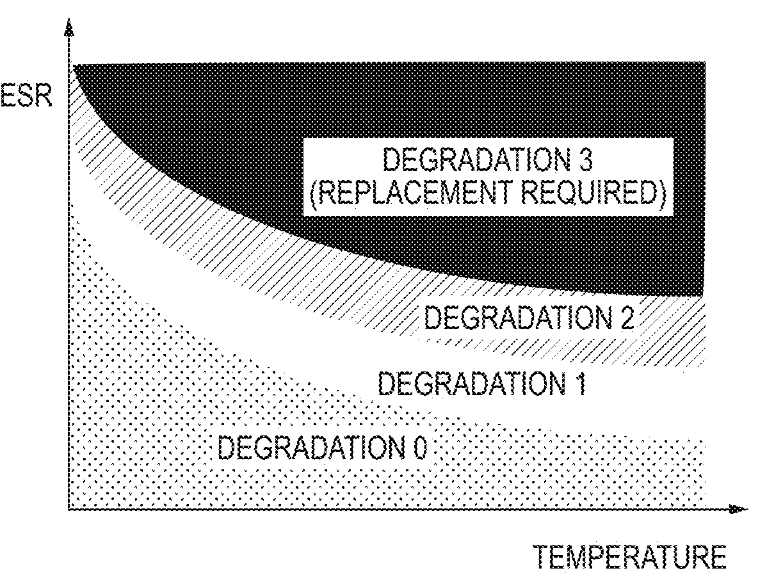
FIG. 7 is a diagram for describing degree of degradation determination.

FIG. 7 is a diagram illustrating regions for each degree of degradation of the power storage device unit 202. The control unit 1011 executes processing to determine the degree of degradation of the power storage device unit 202 on the basis of the relationship between the temperature and the ESR as illustrated in FIG. 7. When the temperature is high, the ESR of the power storage device unit 202 tends to be small. If the ESR is large despite this, this means that the degradation is progressing. Also, when the temperature is low, the ESR of the power storage device unit 202 tends to be high. Thus, it can be determined that if the ESR is increased by a certain amount, this is because of the temperature characteristics.

The control unit 1011 uses the ESR and the temperature information obtained in S505 and S506 to determine which region of FIG. 7 is the ESR and the temperature. Then, according to this, the degree of degradation is determined. Also, in another example, an ESR degradation degree threshold may be set for each temperature, and the degree of degradation may be detected by comparing the obtained ESR and the ESR degradation degree threshold. Note that in this embodiment, higher values for the degree of degradation of the power storage device unit 202 are determined to mean that degradation is progressing.

Next, in S508, the control unit 1011 determines whether or not the operation mode of the image capturing apparatus 100 is the moving image mode. In a case where the operation mode of the image capturing apparatus 100 is the still image mode, the flow proceeds to S509. In a case where the operation mode of the image capturing apparatus 100 is the moving image mode, the flow proceeds to S528.

Here, the moving image mode is an example of a mode in which the supply power of the battery 108 or the USB power supply unit 110 can sufficiently cover the maximum power of the operation mode at the time of image capturing. In a case where, of the still image modes, the mode is a mode with relatively low power such as the low-speed continuous shooting mode or the low-speed readout mode, the flow may proceed to S528 instead of S509.

In S509, the control unit 1011 determines whether or not the power storage device unit 202 can be used. Here, the control unit 1011 determines whether or not the power storage device unit 202 can be used on the basis of the degree of degradation of the power storage device unit 202 determined in S507.

In a case where the degradation of the power storage device unit 202 has progressed to a high degree, the control unit 1011 prohibits image capturing by the image capturing apparatus 100. This is because it can be predicted that, in a case where the degradation of the power storage device unit 202 has progressed, even with control of the main power source path switching unit 401 to put the impedance of the main power source path at maximum, sufficient power cannot be supplied from the power storage device unit 202, causing a system failure in the image capturing apparatus 100. For example, this situation is a situation in which it is predicted that the tolerable power of the battery 108 or the USB power supply unit 110 will be exceeded, causing a system failure due to a large amount of power being attempted to be supplied from the image capturing main power source unit 201 to the image capturing sensor 102. Also, this situation is a situation in which it is predicted that, since the impedance of each path corresponding to the power source path of the image capturing sensor 102 is large, the impedance will cause a voltage drop, which will reduce the output voltage to the image capturing sensor 102 below the operating voltage of the image capturing sensor 102. In a case where degree of degradation of the power storage device unit 202 is enough to actually cause this situation, the flow proceeds to S529. If the degree of degradation is otherwise, the flow proceeds to S510.

In S510, the control unit 1011 determines the temperature of the power storage device unit 202. The estimated temperature of the power storage device unit 202 obtained in S506 and a temperature (Ta) at which degradation of the power storage device unit 202 progresses aggressively are compared, and it is determined whether or not the estimated temperature is equal to or greater than the temperature Ta. In a case where the estimated temperature of the power storage device unit 202 is less than Ta, in other words, there is a low possibility of the degradation of the power storage device unit 202 progressing even if a high voltage is applied to the power storage device unit 202, the flow proceeds to S512. In a case where the estimated temperature of the power storage device unit 202 is equal to or greater than Ta, in other words, there is a high possibility of the degradation of the power storage device unit 202 progressing if a high voltage is continuously applied to the power storage device unit 202, the flow proceeds to S511.

In S511, the control unit 1011 sets the charging voltage for charging the power storage device unit 202 from the power storage device charging and discharging unit 204. In the case of charging the power storage device unit 202 with a constant current charging by the power storage device charging and discharging unit 204, a charging complete voltage is set. In S511, in this situation, the temperature of the power storage device unit 202 is high and the possibility of the power storage device unit 202 degrading is high. Thus, the charging voltage is set to a low value. By setting the charging voltage of the power storage device unit 202 to a low value on the basis of the information of the temperature sensor 105 in this manner, degradation of the power storage device unit 202 can be reduced. Next, the flow proceeds to S513.

In S512 also, the control unit 1011 sets the charging voltage for charging the power storage device unit 202 from the power storage device charging and discharging unit 204. In S512, in this situation, the temperature of the power storage device unit 202 is low and the possibility of the power storage device unit 202 degrading is low. Thus, the charging voltage is set to a high value. In a case where the operation mode of the image capturing apparatus 100 is an operation mode in which it is expected that power is supplied from the power storage device unit 202 to the image capturing sensor 102, the output voltage of the power storage device unit 202 at the time of image capturing is to have at least reached a predetermined voltage greater than the output voltage of the image capturing main power source unit 201. Thus, in a state in which the temperature is low and the possibility of degradation is low, by keeping the charging voltage of the power storage device unit 202 high, the image capturing operation can be smoothly transitioned to without wasting unnecessary charging time at the time of image capturing. Next, the flow proceeds to S513.

In S513, the control unit 1011 sets the charging current for charging the power storage device unit 202 from the power storage device charging and discharging unit 204. In the case of charging the power storage device unit 202 with a constant current charging by the power storage device charging and discharging unit 204, the output current of the power storage device charging and discharging unit 204 is set. The power storage device charging and discharging unit 204 can set the mode of a high output mode in which the charging current is a relatively large current and a low output mode in which the charging current is a relatively small current. In S513, the power storage device charging and discharging unit 204 sets the mode to the high output mode. Accordingly, in a case where the operation mode of the image capturing apparatus 100 is the moving image mode and the charging voltage of the power storage device unit 202 is set to a low value, for example, high-speed charging to the charging voltage which is the goal when changing to the still image mode can be performed. Also, in the time period from switching from the moving image mode to the still image mode to the start of still image capturing, the consumption current of the image capturing apparatus 100 is relatively small and the tolerable power of the battery 108 and the USB power supply unit 110 is not close to being reached. Thus, the power consumption of the image capturing apparatus 100 does not exceed the tolerable power of the battery 108 or the USB power supply unit 110 at this time even when the power storage device charging and discharging unit 204 is in the high output mode.

Next, in S514, the control unit 1011 determines whether or not the user has pressed SW1. SW1 corresponds to a half-press operation of the release button, which is an operation one step before the release operation by the user. The state in which SW1 is pressed can be referred to as an image capturing preparation state in which the image capturing apparatus 100 can quickly transition to the image capturing operation when SW2 is pressed. In response to the SW1 operation, known image capturing preparation processing such as AF processing and AE processing are executed. In a case where SW1 has not been pressed, the flow proceeds to S515. In a case where SW1 has been pressed, the flow proceeds to S516.

In S515, the control unit 1011 determines whether or not an instruction to change the operation mode of the image capturing apparatus 100 has been input. In a case where there is no change to the operation mode of the image capturing apparatus 100, the flow returns to S514. In a case where there is change to the operation mode of the image capturing apparatus 100, the flow returns to S505. For example, in a case where the user performs an off operation on the main power source switch or a similar operation to turn off the image capturing apparatus 100, the flow proceeds to S531.

In S516, the control unit 1011 sets the charging voltage of the power storage device unit 202 to a voltage that allows power to be supplied from the power storage device unit 202 to the image capturing sensor 102. Here, in S512, in a case where the charging voltage is set to the same voltage as the charging voltage of the power storage device unit 202 set in S516, there is no need to re-set the charging voltage of the power storage device unit 202 in S516. In S511, in a case where the charging voltage of the power storage device unit 202 is set to a low value, in S516, the charging voltage of the power storage device unit 202 is set to a voltage that allows power to be supplied from the power storage device unit 202 to the image capturing sensor 102. Accordingly, even in a situation in which the temperature of the power storage device unit 202 is high, the time required to increase the voltage of the power storage device unit 202 can be kept to a minimum. Thus, image capturing operation in the still image mode can be performed while preventing degradation of the power storage device unit 202.

Next, in S517, the control unit 1011 determines whether or not the charging of the power storage device unit 202 is complete. The control unit 1011 compares the voltage set in S516 and the voltage of the power storage device unit 202 and determines whether or not charging is complete. Alternatively, the charging current may be monitored, and whether the charging of the power storage device unit 202 is complete may be determined by whether or not the charging current is stopped. In a case where the charging of the power storage device unit 202 is not complete, the flow proceeds to S518. In a case where the charging of the power storage device unit 202 is complete, the flow proceeds to S519.

In S518, the control unit 1011 displays a live view image on the display unit 103 together with information indicating "busy". Here, the display of "busy" means that the image capturing operation of the image capturing apparatus 100 is unable to be performed. By checking the display of "busy" on the display unit 103, the user can learn whether or not image capturing can be performed. After the display of "busy", the flow returns to S517. This is repeated until the charging of the power storage device unit 202 is complete. When it is determined that the charging of the power storage device unit 202 is complete in S517, the control unit 1011 stops displaying "busy" on the display unit 103.

In S519, the control unit 1011 determines whether or not the user has pressed SW2. SW2 corresponds to a full-press operation of the release button, which is an operation for instructing release by the user. In a case where SW2 has not been pressed, the flow proceeds to S527. In a case where SW2 has been pressed, the flow proceeds to S520.

In S520, the control unit 1011 changes the charging current for charging the power storage device unit 202 from the power storage device charging and discharging unit 204. In the case of charging the power storage device unit 202 with a constant current charging by the power storage device charging and discharging unit 204, the output current of the power storage device charging and discharging unit 204 is changed. In S520, the power storage device charging and discharging unit 204 sets the mode to the low output mode. Accordingly, during still image capturing, the power taken out from the battery 108 or the USB power supply unit 110 can be reduced. In one embodiment, the charging current in S520 is enough so that the voltage of the power storage device unit 202 that voltage dropped due to the high-speed continuous shooting mode with a short image capturing interval or the like is recovered in the time before the next image capturing operation.

Next, in S521, the control unit 1011 sets the main power source path to a non-pass-through-state path. Here, the control unit 1011 determines the main power source path depending on the temperature information of each temperature sensor 105*a* to 105*c*. The lower the temperature of the power storage device unit 202, the higher the ESR of the power storage device unit 202. Thus, by controlling the impedance of the main power source path to be higher when the temperature of the power storage device unit 202 is higher, power can be supplied from the power storage device unit 202 to the image capturing sensor 102 irrespective of the temperature of the image capturing apparatus 100. Also, the ESR of the power storage device unit 202 increases due to degradation. Thus, the main power source path may be determined depending on the ESR of the power storage device unit 202 predicted in S505. In a case where the degree of degradation is within a tolerance range, power can be supplied from the power storage device unit 202 to the image capturing sensor 102 irrespective of the ESR value.

Next, in S522, the control unit 1011 enables the power storage device path. The control unit 1011 controls the power storage device path switching unit 403 and switches it on so that power is supplied from the power storage device unit 202 to the image capturing sensor 102. Accordingly, power can be supplied from the power storage device unit 202 to the image capturing sensor 102 at the time of an image capturing operation.

Next, in S523, the control unit 1011 performs an image capturing operation. Since the voltage of the power storage device unit 202 is greater than the voltage of the image capturing main power source unit 201, power is supplied from the power storage device unit 202 to the image capturing sensor 102. When the voltage of the power storage device unit 202 drops and becomes equal to the voltage of the image capturing main power source unit 201, power to supplied to the image capturing sensor 102 from the path with the smallest impedance from among the main power source path and the power storage device path. In S521, since the impedance of the power storage device path is controlled to be smaller than the impedance of the main power source path, even is the voltage of the power storage device unit 202 drops, in one embodiment, power is supplied from the power storage device unit 202 to the image capturing sensor 102. As a result, even when the image capturing apparatus 100 is in an image capturing state in an operation mode with a large maximum power such as the global shutter mode, the instantaneous power taken out from the battery 108 or the USB power supply unit 110 can be reduced.

Next, in S524, the control unit 1011 determines whether or not SW2 has been released. In a case where SW2 is still pressed, the flow returns to S523, and the next image capturing operation is performed. In a case where SW2 has been released, the image capturing operation is stopped, and the flow proceeds to S525.

Next, in S525, as in S502, the control unit 1011 executes initialization processing of the main power source path switching unit 401.

Next, in S526, as in S503, the control unit 1011 disables the power storage device path.

Next, in S527, the control unit 1011 determines whether or not SW1 has been released. In a case where SW1 is still pressed, the flow returns to S519, and whether or not SW2 has been pressed again is determined. In a case where SW1 and SW2 have been released, the image capturing preparation state is stopped, and the flow returns to S510.

In S528, the control unit 1011 sets the charging voltage of the power storage device unit 202 to a low value. For example, in the case of an operation mode such as the moving image mode in which the supply power of the battery 108 or the USB power supply unit 110 sufficiently covers the maximum power of the image capturing sensor 102, the charging voltage of the power storage device unit 202 is set to a low value even if an image capturing operation is in progress. In this manner, degradation of the power storage device unit 202 can be prevented. In particular, in a case where the operation mode of the image capturing apparatus 100 is the moving image mode as given in the example, image capturing is often continued for a long amount of time. Thus, the internal temperature of the image capturing apparatus 100 may increase, and the temperature of the power storage device unit 202 may also increase. In an operation mode in which the temperature of the power storage device unit 202 tends to increase, to prevent degradation, it is important to set the charging voltage of the power storage device unit 202 to a low value. Also, when the mode is switched to a still image mode even when the charging voltage of the power storage device unit 202 is set to a low value, in S513, the charging current is increased, and the power storage device unit 202 is quickly charged. Thus, the still image image capturing operation can be quickly transitioned to. Next, the flow proceeds to S530.

In S529, the control unit 1011 displays on the display unit 103 information indicating that the operation mode cannot be used due to degradation of the power storage device unit 202. This information indicating degradation of the power storage device unit 202 tells the user that the mode cannot be used and that the power storage device unit 202 is degrading. In a case where the user who sees the information indicating degradation of the power storage device unit 202 wishes to use this operation mode in the future, the user can handle this by replacing the power storage device unit 202 or the like. Also, in S529, a display guiding the user to an alternative usable mode may be displayed, and the user can continue image capturing using this alternative mode. Next, the flow proceeds to S530.

In S530, as in S515, the control unit 1011 determines whether or not there has been a user operation corresponding to changing the operation mode of the image capturing apparatus 100. In a case where there is no change to the operation mode of the image capturing apparatus 100, S530 is repeated and a mode change is waited for while the live view state is continued. In a case where there is change to the operation mode of the image capturing apparatus 100, the flow returns to S505. For example, in a case where the user performs an off operation on the main power source switch or a similar operation to turn off the image capturing apparatus 100, the flow proceeds to S531.

In S531, the control unit 1011 sets the charging voltage of the power storage device unit 202 to 0 V. This can reduce the degradation of the power storage device unit 202 when the image capturing apparatus 100 is powered off.

Next, in S532, the control unit 1011 executes end processing for the image capturing apparatus 100. In the end processing for the image capturing apparatus 100, in addition to end processing for each device, a shut-down operation of the power source unit 107 is performed.

For example, in a case where the target voltage of the power storage device unit 202 is less than the current voltage in S511, S528, and S531, the output of the power storage device charging and discharging unit 204 may be stopped, and waiting may be performed until natural discharge bring the voltage to the target voltage. In this case, the frequency in which the power once built up in the power storage device 202 lapses is reduced, which is advantageous for the battery retention of the battery 108. However, there is a possibility of degradation progressing due to the increased amount of time taken to apply voltage. Thus, the power storage device charging and discharging unit 204 may be provided with a discharge function, and discharge may be performed before the voltage reaches the target voltage. In this case, since the voltage of the power storage device unit 202 quickly drops, degradation of the power storage device unit 202 can be reduced.

FIGS. 8A and 8B are diagrams for describing an example of the switching settings of the main power source path switching unit 401. As illustrated in FIGS. 8A and 8B, the control unit 1011 controls switching on and off the switches of the main power source path switching unit 401 for each operation mode. For each switch in FIGS. 8A and 8B, "○" indicates on and "–" indicates off.

The still image mode has a relatively large maximum value (maximum power) for power consumption of the image capturing apparatus 100. Thus, it is expected that, in the still image mode, the image capturing sensor 102 operates by power being supplied from the power storage device unit 202. The moving image mode has a relatively small maximum power of the image capturing apparatus 100. Thus, it is expected that the image capturing sensor 102 operates without power being supplied from the power storage device unit 202. Also, in the still image modes, in particular the global shutter mode, it is expected that the maximum power of the image capturing apparatus 100 is large and more power is supplied from the power storage device unit 202 to the image capturing apparatus 100 to operate the image capturing apparatus 100.

FIG. 8A is a table of the switching settings for the main power source path switching unit 401 in the case of switching the main power source path depending on the temperature.

When the temperature is 20° C. or higher, in the global shutter mode, the path B and the path C are switched on. Here, the impedance of the main power source path becomes the combined resistance of the resistor 402*b* and the resistor 402*c* arranged in parallel. Also, in a still image mode other than the global shutter mode, the path A and the path C are switched on. Here, the impedance of the main power source path becomes the combined resistance of the resistor 402*a* and the resistor 402*c* arranged in parallel. In the moving image mode or the still image mode, when in the live view state, the pass-through state is set.

In this manner, when operation modes that provide more power from the power storage device unit 202 to the image capturing sensor 102 are used, the current limiting of the main power source path is increased. Conversely, in operation modes in which not much power is to be supplied from the power storage device unit 202, limiting of the main power source path is relaxed so that power is not supplied from the power storage device unit 202 more than necessary, allowing loss in the main power source path to be reduced. In addition, loss due to charging and discharging of the power storage device unit 202 can be reduced.

Also, when the temperature is less than 20° C. and equal to or greater than 0° C., the switch state is switched so that the impedance of the main power source path in each mode is increased. This is to increase the ESR of the power storage device unit 202 in a low-temperature state, and by increasing the impedance of the main power source path, power can be supplied from the power storage device unit 202 to the image capturing sensor 102. Conversely, when the temperature is sufficiently high, the limiting of the main power source path is relaxed, allowing loss in the main power source path and loss due to charging and discharging of the power storage device unit 202 to be reduced. Also, it is expected that, in the moving image mode or the still image mode, in a live view state, the image capturing sensor 102 is operated without power being supplied from the power storage device unit 202 to the image capturing sensor 102. Thus, the pass-through state is fixed irrespective of the temperature.

In a similar manner, when the temperature is less than 0° C., the switch state is switched so that the impedance of the main power source path in each mode is further increased.

FIG. 8B is a table of the switching settings for the main power source path switching unit 401 in the case of switching the main power source path depending on the ESR of the power storage device unit 202.

In the case of estimating the ESR of the power storage device unit 202, the path B is switched on irrespective of the operation mode of the image capturing apparatus 100 and other settings. The control unit 1011 can predict the ESR of the power storage device unit 202 from the information of the main power source current detection unit 404 when the image capturing sensor is operated in addition to the known resistance B and the operating power of the image capturing sensor. The switch state of the main power source path switching unit 401 is switched at the time of image capturing according to the predicted ESR.

In a case where the ESR of the power storage device unit 202 is less than 100 mΩ, in the global shutter mode, the path B and the path C are switched on. Here, the impedance of the main power source path becomes the combined resistance of the resistor 402*b* and the resistor 402*c* arranged in parallel. Also, in a still image mode other than the global shutter mode, the path A and the path C are switched on. Here, the impedance of the main power source path becomes the combined resistance of the resistor 402*a* and the resistor 402*c* arranged in parallel. In the moving image mode or the still image mode, when in the live view state, the pass-through state is set. In this manner, when operation modes that provide more power from the power storage device unit 202 to the image capturing sensor 102 are used, the current limiting of the main power source path is increased. Conversely, in operation modes in which not much power is to be supplied from the power storage device unit 202, limiting of the main power source path is relaxed so that power is not supplied from the power storage device unit 202 more than necessary, allowing loss in the main power source path to be reduced. In addition, loss due to charging and discharging of the power storage device unit 202 can be reduced.

Also, in a case where the ESR of the power storage device unit 202 is equal to or greater than 100 mΩ and less than 400 mΩ, the switch state is switched so that the impedance of the main power source path in each mode is increased. Since the ESR of the power storage device unit 202 is increased, the impedance of the main power source path is increased. Thus, power can be supplied from the power storage device unit 202 to the image capturing sensor 102. Conversely, when the ESR of the power storage device unit 202 is sufficiently low, the limiting of the main power source path is relaxed, allowing loss in the main power source path and loss due to charging and discharging of the power storage device unit 202 to be reduced. Also, it is expected that, in the moving image mode or the still image mode, in a live view state, the image capturing sensor 102 is operated without power being supplied from the power storage device unit 202 to the image capturing sensor 102. Thus, the pass-through state is fixed irrespective of the ESR of the power storage device unit 202.

In a similar manner, in a case where the ESR of the power storage device unit 202 is equal to or greater than 400 mΩ and less than 600 mΩ, the switch state is switched so that the impedance of the main power source path in each mode is further increased.

In a case where the ESR of the power storage device unit 202 is equal to or greater than 600 mΩ, image capturing in the global shutter mode is prohibited. This is because it can be predicted that even if only the path C is switched on to put the impedance of the main power source path at maximum, sufficient power cannot be supplied from the power storage device unit 202, causing a system failure in the image capturing apparatus 100. For example, this situation is a situation in which it is predicted that the tolerable power of the battery 108 or the USB power supply unit 110 will be exceeded, causing a system failure due to a large amount of power being attempted to be supplied from the image capturing main power source unit 201 to the image capturing sensor 102. Also, this situation is a situation in which it is predicted that, since the impedance of each path corresponding to the power source path of the image capturing sensor 102 is large, the impedance will cause a voltage drop, which will reduce the output voltage to the image capturing sensor 102 below the operating voltage of the image capturing sensor 102. Depending on the ESR, the image capturing operation can be prohibited before such predicted situations actually occur.

FIG. 8C is a diagram for describing the settings for each operation mode of the power storage device charging and discharging unit 204. As illustrated in FIG. 8C, the control unit 1011 sets the charging voltage and the charging current of the power storage device unit 202 via the power storage device charging and discharging unit 204.

During image capturing in the global shutter mode, the charging voltage of the power storage device unit 202 is set to 5.0 V. For example, when the output voltage of the image capturing main power source unit 201 is set to 4.5 V, the voltage of the power storage device path becomes higher than that of the main power source path, thus allowing power to be supplied from the power storage device unit 202 to the image capturing sensor 102. Also, in the case of a live view state and the estimated temperature of the power storage device unit 202 being higher than Ta, the charging voltage is lowered to 2.0 V. In this manner, degradation of the power storage device can be reduced.

Here, in a case where the charging voltage is set to 0 V and, in this state, the user performs a start operation for an image capturing operation, it takes time for the voltage to charge from 0 V to 5.0 V. This creates more time in which the user cannot perform image capturing. Thus, even if the temperature is higher than Ta, charging is performed to an extent in which degradation does not significantly progress. Also, when the estimated temperature of the power storage device unit 202 is lower than Ta, the charging voltage is set to approximately 4.5 V to prevent degradation of the power storage device unit 202. Since little time is used to charge from 4.5 V to 5.0 V, the voltage of the power storage device unit 202 can be quickly increase by increasing the charging voltage from 4.5 V to 5.0 V according to an image capturing instruction. Accordingly, the user does not have to wait to perform image capturing.

During image capturing in a still image mode other than the global shutter mode, the charging voltage of the power storage device unit 202 is set to 4.5 V. In a still image mode other than the global shutter mode, since not as much power is to be supplied from the power storage device unit 202 to the image capturing sensor 102 compared to when in the global shutter mode, the charging voltage of the power storage device unit 202 is lower than when in the global shutter mode. Setting the charging voltage of the power storage device unit 202 to the optimal voltage depending on the operation mode in this manner is important in reducing the degradation of the power storage device unit 202. Also, in the case of a live view state and the estimated temperature of the power storage device unit 202 being higher than Ta, the charging voltage is lowered to 2.0 V as when in the global shutter mode.

In the case of a moving image mode, irrespective of whether an image capturing operation is in progress or whether a live view state is active, the charging voltage of the power storage device unit 202 is undifferentiatedly set to 2.0 V. In this manner, by reducing the charging voltage of the power storage device unit 202 when in a mode in which it is expected that the image capturing sensor 102 operates without power being supplied from the power storage device unit 202, degradation of the power storage device unit 202 can be reduced. Here, the reason why the charging voltage of the power storage device unit 202 is not set to 0 V is so that, when an image capturing operation is attempted to be started immediately after the user has switched to a still image mode, the charging time used to charge the power storage device unit 202 to 5.0 V can be reduced even by a small amount.

Also, in the case of measuring the ESR, the charging voltage of the power storage device unit 202 is set to 4.5 V. Here, 4.5 V is the same voltage as the output voltage of the image capturing main power source unit 201. By setting the charging voltage of the power storage device unit 202 to 4.5 V, an impedance ratio of each path can be calculated from the current ratio of each path.

Also, in a case where the image capturing apparatus 100 is powered off, there is a possibility of this state continuing for a long amount of time. Thus, the charging voltage of the power storage device unit 202 is set to 0.0 V. This can reduce the degradation of the power storage device unit 202 while the image capturing apparatus 100 is powered off.

Here, for example, in a case where the operation mode is switched from the moving image mode to the global shutter mode, the charging voltage is changed from 2.0 V to 5.0 V. But if the charging current is small at this time, it takes longer for image capturing to be able to be performed by the user after switching modes. Thus, in the live view state from the transition of the operation mode to the start of image capturing, the power storage device charging and discharging unit 204 charges the power storage device unit 202 at a charging current of 300 mA in a high output mode. Also, when image capturing starts while in the high output mode, the power taken out from the battery 108 or the USB power supply unit 110 increases due to the charging current of the power storage device unit 202. Thus, before the start of image capturing, the power storage device charging and discharging unit 204 is set to the low output mode and charges the power storage device unit 202 at a charging current of 100 mA. It is sufficient that the switch from the high output mode to the low output mode is performed before the start of image capturing, and for example, the low output mode may be switched to after the voltage of the power storage device unit 202 is detected and charging is completed with the voltage of the power storage device unit 202 reaching 5.0 V. Alternatively, the difference between the voltage of the power storage device unit 202 at the time of an instruction to switch operation mode and the post-change charging voltage of 5.0 V is detected. Then, the low output mode may be switched to after the amount time required to charge the current voltage to 5.0 V by the power storage device unit 202 according to the difference in voltage elapses.

Figure 9B:
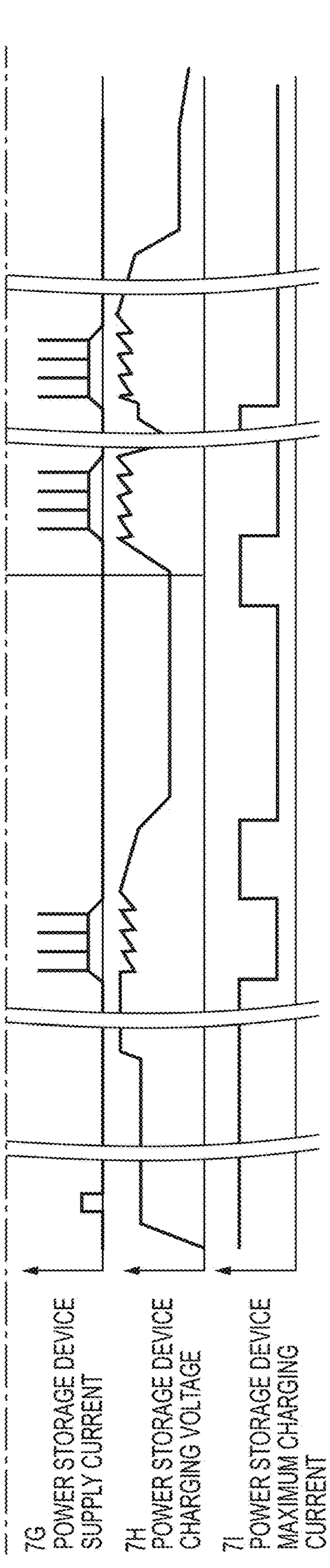

FIGS. 9A and 9B are timing charts illustrating representative operations of the image capturing apparatus 100 according to the present embodiment. Note that this timing chart is an example of operations, and the image capturing apparatus 100 appropriately operates according to user operations. In the graphs 7C to 7I of FIG. 7, the horizontal axial direction represents the passage of time.

In FIGS. 9A and 9B, from the top, user operations on the image capturing apparatus 100 are illustrated in 7A, and operations of the image capturing apparatus 100 according to the user operations of 7A are illustrated in 7B. 7C illustrates the amount of current consumed by the image capturing sensor 102 when the image capturing sensor 102 is operated. 7D illustrates the temperature of the power storage device unit 202 estimated on the basis of the temperature information from the temperature sensor 105.

7E illustrates paths used for power supply by the main power source path switching unit 401 from among the image capturing main power source unit 201 and the power storage device unit 202. In the case of a low level (pass through) in 7E, power is supplied from the image capturing main power source unit 201 to the image capturing sensor 102. In the case of a high level (resistance on) in 7E, power is supplied from the power storage device unit 202 to the image capturing sensor 102.

7F illustrates the current amount supplied from the image capturing main power source unit 201. The current amount is not to exceed the maximum power of the battery 108 or the USB power supply unit 110. 7G illustrates the current amount supplied from the power storage device unit 202. 7H illustrates the voltage the power storage device unit 202 is charged with. 7I illustrates the maximum current amount when charging the power storage device unit 202.

Operations will be described below in conjunction with user operations on the image capturing apparatus 100.

The user presses the power source lever and starts up the image capturing apparatus 100 (T701). First, the image capturing apparatus 100 is set to operate in the global shutter mode. The image capturing apparatus 100 starts the initialization operation (7B) and increases the current value of the image capturing sensor 102 (7C). When the current value of the image capturing sensor 102 becomes stable, the main power source path switching unit 401 is switched (7F). When the operation of the image capturing sensor 102 is performed with the power from the power storage device unit 202, the degradation of the power storage device unit 202 is determined. In the description of the timing charts of FIGS. 9A and 9B, it is assumed that there is no degradation in the power storage device unit 202. When the degradation determination ends, the live view state is transitioned to. In the live view state, the charging voltage of the power storage device unit 202 is set to a voltage (approximately 4.5 V) that does not require time for charging and that tends not to help degradation progress in times of non-high temperatures (7H). In the present embodiment, the mode is set to still image and global shutter mode by a user operation.

Next, the user presses SW1 to cause an AF operation to be performed (T702). At this time, the image capturing apparatus 100 enters an image capturing standby state, and the power storage device unit 202 is charged to a voltage (approximately 5.0 V) that can supply sufficient power to the image capturing sensor 102 (7H).

Thereafter, when the user presses SW2, an image capturing operation is transitioned to (T703). Since the image capturing is in the global shutter mode, the consumption current of the image capturing sensor 102 instantaneously increases (7C). At this time, the maximum charging current of the power storage device unit 202 decreases (7I). Specifically, the maximum charging current decreases from approximately 300 mA to approximately 100 mA. Also, the main power source path switching unit 401 switches (7E). Specifically, the path B is switched on to change the path from the pass-through state to a path through the resistor 402*b* (approximately 200 mΩ). By performing the operations described above, the instantaneous large current of the image capturing sensor 102 can be supplied from the power storage device unit 202. Also, operations can be performed while complying with the rated current of the battery 108 and the USB power supply unit 110 without the current from the image capturing main power source unit 201 becoming too large.

When the user releases SW1 and SW2, the image capturing operation ends, and the state returns to the live view state (T704). Here, the maximum charging current of the power storage device unit 202 increases (7I). Specifically, the current increases from approximately 100 mA to approximately 300 mA. Also, the main power source path switching unit 401 switches (7E). Specifically, the path switches from the path through the resistor 402*b* (approximately 200 mΩ) of the path B to the pass-through state.

Next, the user performs a mode switch to change the move from the still image mode to the moving image mode (T705). The consumption current of the image capturing sensor 102 in the moving image mode according to the present embodiment has a large average current value, but the current value does not exceed the instantaneous value of the still image mode (7C). Thus, in the moving image mode, image capturing can be performed without using the power of the power storage device unit 202. The charging voltage (approximately 2.0 V) of the power storage device unit 202 decreases (7H), and the maximum charging current to the power storage device unit 202 also decreases (7I). Specifically, the maximum charging current decreases from approximately 300 mA to approximately 100 mA.

On the other hand, since in the moving image mode, the average current is large, the internal temperature of the image capturing apparatus 100 increases, and thus the temperature of the built-in power storage device unit 202 also increases. When moving images are continuously captured for a certain amount of time, the temperature exceeds Ta (7D).

The moving image capturing is ended by a user operation, and the mode transitions to the still image mode (T706). The power storage device unit 202 is in a state in which the temperature is exceeding Ta (7D). At this time, the charging voltage (approximately 2.0 V) of the power storage device unit 202 is made not to be increased to prevent the degradation of the power storage device unit 202 (7H).

Next, the user simultaneously presses SW1 and SW2 (T707). Here, the power storage device unit 202 is charged to the operating voltage (approximately 5.0 V) of the image capturing sensor 102 (7H). However, since the temperature of the power storage device unit 202 is high, the charging voltage of the power storage device unit 202 is low and time is needed for charging. During this time, the image capturing apparatus 100 displays "busy" on the display unit 103 to display to the user information indicating that image capturing in the global shutter mode cannot be performed. In other words, the user is indirectly notified that a specific operation cannot be performed due to an increase in the temperature of the power storage device unit 202.

When the charging of the power storage device unit 202 is complete, the maximum charging current of the power storage device unit 202 decreases (7I). Specifically, the maximum charging current decreases from approximately 300 mA to approximately 100 mA. The main power source path switching unit 401 switches (7E). Specifically, the path B is switched on to change the path from the pass-through state to a path through the resistor 402*b* (approximately 200 mΩ). By performing the operations described above, the instantaneous large current of the image capturing sensor 102 can be supplied from the power storage device unit 202. Also, operations can be performed while complying with the rated current of the battery 108 and the USB power supply unit 110 without the current from the image capturing main power source unit 201 becoming too large.

When the user releases SW1 and SW2, the image capturing ends, and the state returns to the live view state (T708). The maximum charging current of the power storage device unit 202 increases (7I). Specifically, the current increases from approximately 100 mA to approximately 300 mA. Also, the main power source path switching unit 401 switches (7E). Specifically, the path switches from the path through the resistor 402*b* (approximately 200 mΩ) of the path B to the pass-through state.

When the temperature of the power storage device unit 202 sufficiently decreases, the operations of T709 and T710 are performed as in T703 and T704.

From here, in a case where there is no user operation for a certain amount of time, the image capturing apparatus 100 enters a power saving mode (T711). Here, the power of the image capturing sensor 102 is turned off, and the voltage of the power storage device unit 202 decreases (7H).

Also, when the power source lever of the image capturing apparatus 100 is turned to off (T712), the voltage of the power storage device unit 202 decreases to 0 V (7H).

FIG. 10 is a diagram illustrating various types of information displayed on the display unit 103. The control unit 1011 displays the various types of information on the display unit 103 to notify the user of the information. Here, the global shutter mode is an example of an operation mode of the image capturing apparatus 100 in which it is expected that power is supplied from the power storage device unit 202 to the image capturing sensor 102.

A display 1001 is information displayed on the display unit 103 when, after the user sets the mode to the global shutter mode, it is determined from the degree of degradation of the power storage device unit 202 that an image capturing operation in the global shutter mode cannot be performed. Here, the degree of degradation of the power storage device unit 202 is calculated on the basis of the prediction of the ESR of the power storage device unit 202 and the temperature information of the temperature sensor 105.

The information displayed in the display 1001 indicates that image capturing in the current mode is prohibited due to the degradation of the power storage device unit 202. In addition, information for switching to a different operation mode is displayed as an alternative, and the user may change to the alternative operation mode by selecting a display 1003. If a display 1002 is selected, the state becomes a live view state in the current mode. Via the display 1001, the user can learn that image capturing in the current operation mode cannot be performed and that the degradation of the power storage device unit 202 is progressing. Also, another image capturing mode can be switched to by using the display 1001. The display 1001 is displayed in S529 of FIG. 5A, for example.

A display 1004 is information displayed when, after the user sets the mode to the global shutter mode, it is determined from the very low temperature of the power storage device unit 202 that an image capturing operation in the global shutter mode cannot be performed. Via the display 1004, the user is notified that the power storage device unit 202 cannot be used due to its low temperature. The user can learn that image capturing in the global shutter mode is possible if the temperature of the image capturing apparatus 100 increases. Also, as with the display 1001, information for switching to a different operation mode is displayed. When a display 1006 is selected, the mode changes to a different image capturing operation mode. If a display 1005 is selected, the state becomes a live view state in the current mode. The display 1004 is displayed in S529 of FIG. 5A, for example.

A display 1007, as with the display 1001, is an example of information displayed when, after the user sets the mode to the global shutter mode, it is determined from the degree of degradation of the power storage device unit 202 that an image capturing operation in the global shutter mode cannot be performed. Via the display 1007, the user is notified that the power storage device unit 202 is to be replaced. For example, in a case where the power storage device unit 202 can be replaced by hand, the user can be prompted by the display to replace the power storage device unit 202. The display 1007 is displayed in S529 of FIG. 5A, for example.

A display 1008, as with the display 1001 and the display 1007, is an example of information displayed when, after the user sets the mode to the global shutter mode, it is determined from the degree of degradation of the power storage device unit 202 that an image capturing operation in the global shutter mode cannot be performed. Via the display 1008, the user is notified that an abnormality has occurred in the image capturing apparatus 100. For example, a user who has seen the display can confirm that the image capturing apparatus 100 is to be repaired. Also, by an error code associated with the degradation of the power storage device unit 202 being displayed, the user or the repairperson can check the error code and learn of the abnormality in the power storage device unit 202. The display 1008 is displayed in S529 of FIG. 5A, for example.

A display 1009 is an example of a live view display in a state in which it is determined from the degree of degradation of the power storage device unit 202 that an image capturing operation in the global shutter mode cannot be performed. For example, the display 1009 is displayed when the user selects the display 1002 on the display 1001 or when the user selects the display 1005 on the display 1004. An icon indicating a state in which image capturing in the global shutter mode is prohibited is overlaid on the live view. Via the display 1009, the user can easily learn whether or not image capturing can be currently performed. Also, in a case where this is displayed due to low temperature, display of the icon is stopped when the temperature increases and power can be supplied from the power storage device unit 202 to the image capturing sensor 102. This allows the user to learn that image capturing can now be performed.

The display 1001, 1004, 1007, 1008, 1009 have in common that they are displayed in a case where it is determined from the degree of degradation of the power storage device unit 202 that an image capturing operation in the global shutter mode cannot be performed. Also, these displays are first displayed when the user sets the mode to the global shutter mode. Accordingly, they are not displayed while the user is using the image capturing apparatus 100 in another mode. Thus, the user can further concentrate on image capturing even if the power storage device unit 202 is degraded, for example.

A display 1010 is an example of a live view display in a state in which image capturing cannot be performed until charging of the power storage device unit 202 is complete.

An icon indicating the need to wait for image capturing is overlaid on the live view display. Via the display 1010, the user can easily learn whether or not image capturing can be currently performed. Also, when charging of the power storage device unit 202 is complete, display of the icon is stopped. This allows the user to learn that image capturing can now be performed. The display 1010 is displayed in S518 of FIG. 5B, for example.

A display 1011 is an example of the settings screen of the image capturing apparatus 100. For example, when the user presses the menu button of the image capturing apparatus 100, the display 1011 is displayed on the display unit 103. The display 1011 displays items for checking the information of the battery 108 and items for checking the degree of degradation of the power storage device unit 202, for example. When the user performs an operation on the display 1011 to display the degree of degradation of the power storage device unit 202, a display 1012 and a display 1013 are displayed depending on the degree of degradation of the power storage device unit 202. The display 1012 is displayed in a case where the degree of degradation of the power storage device unit 202 still allows the global shutter mode to be used. The display 1012 displays how much the power storage device unit 202 has degraded. The display 1013 is displayed in a case where the power storage device unit 202 has degraded to a degree where the global shutter mode cannot be used. Via the display 1013, the user can be notified to the need for replacement in addition to the information indicating the degree of degradation of the power storage device unit 202. Via this display, the user can be prompted to replace the power storage device unit 202.

As described above, according to the embodiments, the image capturing apparatus 100 uses the power from the image capturing main power source unit 201 to charge the power storage device unit 202. In the first operation state, the image capturing apparatus 100 performs control so that power is supplied form the image capturing main power source unit 201 to the image capturing sensor 102 without power being supplied from the power storage device unit 202 to the image capturing sensor 102. Also, in the second operation state in which the maximum power consumption of the image capturing sensor 102 is greater than in the first operation state, the image capturing apparatus 100 performs control so that power is supplied from the image capturing main power source unit 201 and the power storage device unit 202 to the image capturing sensor 102. Accordingly, the peak current of the main power source for supplying power to the image capturing sensor can be reduced.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-171526, filed Oct. 2, 2023, which is hereby incorporated by reference herein in its entirety.

What is claimed is:

1. An apparatus comprising:
a load circuit;
a power source;
a power storage device;
a charging circuit that uses power from the power source to charge the power storage device; and
at least one processor;
which functions as:
a detection unit that detects a temperature of the power storage device,
a control unit that controls power supply to the load circuit according to a state of the apparatus, wherein
the control unit, in a first state of the apparatus, performs control so that power is supplied from the power source to the load circuit without power being supplied from the power storage device to the load circuit and, in a second state of the apparatus in which a maximum power consumption of the load circuit is greater than in the first state, performs control so that power is supplied from the power source and the power storage device to the load circuit,
the control unit sets a charging complete voltage of the power storage device via the charging circuit depending on the detected temperature, and
wherein in a case where a voltage from the power storage device is lower than a voltage from the power source, the control unit limits operation of a specific mode of the apparatus.

2. The apparatus according to claim 1, wherein
the load circuit is an image capturing sensor.

3. The apparatus according to claim 1, wherein
the power storage device is an electric double layer capacitor or a solid-state battery.

4. The apparatus according to claim 1, further comprising:
a temperature sensor,
wherein the detection unit detects a temperature of the power storage device by estimating a temperature of the power storage device based on an output of the temperature sensor.

5. The apparatus according to claim 1, wherein
in a case where the detected temperature is not higher than a predetermined value, the control unit sets the charging complete voltage to a first voltage, and in a case where the detected temperature is higher than the predetermined value, the control unit sets the charging complete voltage to a second voltage lower than the first voltage.

6. The apparatus according to claim 1, wherein the specific mode is a still image capturing mode.

7. The apparatus according to claim 1, wherein the specific mode is a still image continuous shooting mode for capturing still images at a speed faster than a predetermined speed.

8. The apparatus according to claim 1, wherein the specific mode is an image capturing mode for simultaneously reading out signals of a plurality of pixels of an image capturing sensor.

9. The apparatus according to claim 1, wherein the power source includes a battery and/or an external power supply apparatus.

10. The apparatus according to claim 9, wherein the external power supply apparatus supplies power to the apparatus according to USB Power Delivery protocol.

11. A method for controlling an apparatus including a load circuit, a power source that supplies power to the load circuit, and a power storage device that supplies power to the load circuit, the method comprising:

charging the power storage device using power from the power source;

detecting a temperature of the power storage device;

controlling power supply to the load circuit, wherein in a first state of the apparatus, control is performed so that power is supplied from the power source to the load circuit without power being supplied from the power storage device to the load circuit and, in a second state in which a maximum power consumption of the load circuit is greater than in the first state, control is performed so that power is supplied from the power source and the power storage device to the load circuit, in the charging, a charging complete voltage of the power storage device is changed depending on the detected temperature, and wherein in a case where a voltage from the power storage device is lower than a voltage from the power source, the controlling limits operation of a specific mode of the apparatus.

12. The method according to claim 11, further comprising:

detecting a temperature of the power storage device by estimating a temperature of the power storage device based on an output of a temperature sensor.

13. The method according to claim 11, wherein in a case where the detected temperature is not higher than a predetermined value, the controlling sets the charging complete voltage to a first voltage, and in a case where the detected temperature is higher than the predetermined value, the controlling sets the charging complete voltage to a second voltage lower than the first voltage.

14. A non-transitory computer-readable storage medium storing a program for causing a computer to execute a method for controlling an apparatus including a load circuit, a power source that supplies power to the load circuit, and a power storage device that supplies power to the load circuit, the method including:

charging the power storage device using power from the power source;

detecting a temperature of the power storage device;

controlling power supply to the load circuit, wherein in a first state of the apparatus, control is performed so that power is supplied from the power source to the load circuit without power being supplied from the power storage device to the load circuit and, in a second state in which a maximum power consumption of the load circuit is greater than in the first state, control is performed so that power is supplied from the power source and the power storage device to the load circuit, in the charging, a charging complete voltage of the power storage device is changed depending on the detected temperature, and wherein in a case where a voltage from the power storage device is lower than a voltage from the power source, the controlling limits operation of a specific mode of the apparatus.

15. The non-transitory computer-readable storage medium according to claim 14, further comprising:

detecting a temperature of the power storage device by estimating a temperature of the power storage device based on an output of a temperature sensor.

16. The non-transitory computer-readable storage medium according to claim 14, wherein in a case where the detected temperature is not higher than a predetermined value, the controlling sets the charging complete voltage to a first voltage, and in a case where the detected temperature is higher than the predetermined value, the controlling sets the charging complete voltage to a second voltage lower than the first voltage.

* * * * *